(12) United States Patent
Bowser

(10) Patent No.: US 12,603,985 B1
(45) Date of Patent: Apr. 14, 2026

(54) 3D PHOTOGRAPHY AND VIDEOGRAPHY IMAGE CREATOR AND VIEWER

(71) Applicant: Retinal 3-D, L.L.C., Mesa, AZ (US)

(72) Inventor: Roger C. Bowser, Mesa, AZ (US)

(73) Assignee: Retinal 3-D, L.L.C., Mesa, AZ (US)

( * ) Notice: Subject to any disclaimer, the term of this patent is extended or adjusted under 35 U.S.C. 154(b) by 0 days.

(21) Appl. No.: 19/326,178

(22) Filed: Sep. 11, 2025

Related U.S. Application Data

(60) Provisional application No. 63/729,670, filed on Dec. 9, 2024.

(51) Int. Cl.
| | |
|---|---|
| *H04N 13/327* | (2018.01) |
| *H04N 13/296* | (2018.01) |
| *H04N 13/344* | (2018.01) |
| *H04N 13/383* | (2018.01) |

(52) U.S. Cl.
CPC ......... *H04N 13/327* (2018.05); *H04N 13/296* (2018.05); *H04N 13/344* (2018.05); *H04N 13/383* (2018.05)

(58) Field of Classification Search
CPC .................................................... H04N 13/327
USPC ............................................................ 348/46
See application file for complete search history.

(56) References Cited

U.S. PATENT DOCUMENTS

| | | |
|---|---|---|
| 10,726,560 B2 | 7/2020 | Holzer et al. |
| 12,010,431 B2 | 6/2024 | Dal Mutto et al. |

| | | |
|---|---|---|
| 12,108,019 B2 | 10/2024 | Ardisana, II et al. |
| 2020/0064635 A1* | 2/2020 | Franklin ............ G02B 27/0955 |
| 2023/0045393 A1 | 2/2023 | Siver et al. |
| 2024/0176025 A1 | 5/2024 | Buback |
| 2024/0357071 A1 | 10/2024 | Hu et al. |

FOREIGN PATENT DOCUMENTS

| | | |
|---|---|---|
| JP | 7149322 B2 | 10/2022 |
| KR | 2020-0061488 A | 6/2020 |
| WO | WO 2019/018396 A1 | 1/2019 |
| WO | WO 2022/261111 A1 | 12/2022 |

OTHER PUBLICATIONS

Park, Min-Chul, Sang Ju Park, and Jung-Young Son. "Stereoscopic imaging and display for a 3-D mobile phone." Applied optics 48.34 (2009): H238-H243.

* cited by examiner

*Primary Examiner* — Amir Shahnami
(74) *Attorney, Agent, or Firm* — Knobbe, Martens, Olson & Bear, LLP

(57) ABSTRACT

3D photography and videography image creator and viewer are disclosed. In one aspect, a method for reducing parallax eye strain when viewing a 3D image using a stereo image viewer includes displaying a 3D image on a stereo image viewer, illuminating a first vertical line on the left lens at a center of the left lens, and adjusting a position of the left lens to align the first vertical line illuminated on the left lens with a center of the user's left eye. The method also includes illuminating a second vertical line on the right lens at a center of the right lens and adjusting a position of the right lens to align the second vertical line illuminated on the right lens with a center of the user's right eye.

20 Claims, 22 Drawing Sheets

100

300

350

(Example)
123 Degrees (Example)
123 Degrees (Example)
123 Degrees $Z_1$        $Z_2$ Visual Axis of Each Eye Baseline Oblique Horizon Image Level Baseline 13.0°

Camera Level Baseline

Camera Centerline of Lens is Always in the Centerline of any Image Displayed

Level Horizon

Parallel Horizon and Image Level Baseline

Image Level Baseline

Horizontal Baselines that do not work

First, Lowest, Common Level Horizontal Baseline

Masked Image Area on Corrected, Oblique, Stereo Pairs is not Lost, But Stored in Original File Until Deleted

LT     RT     LT     RT

Horizon

Mask Lines for Corrected Oblique Images

Mask Lines for Corrected Oblique Images

Baseline

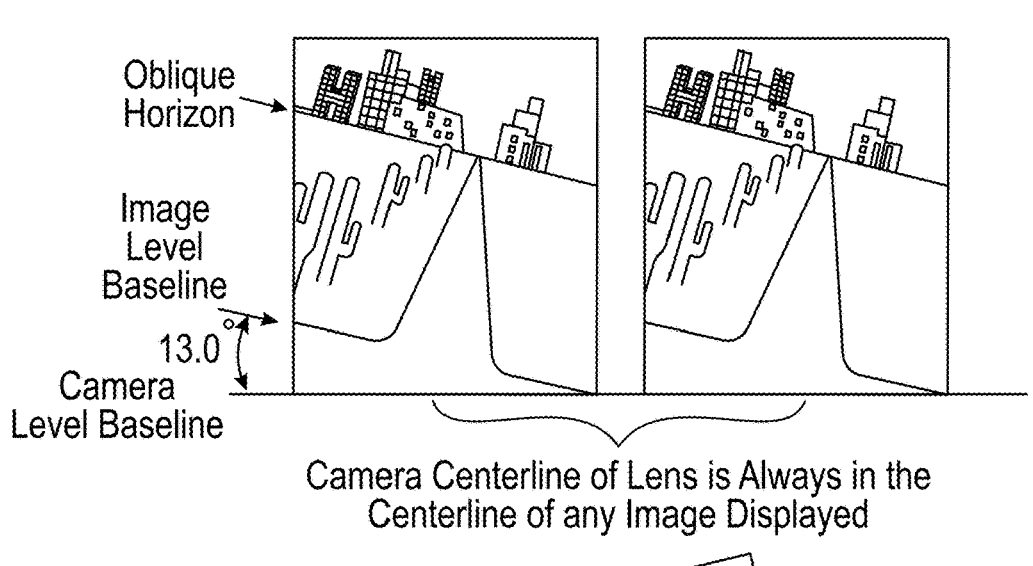

FIG. 12A

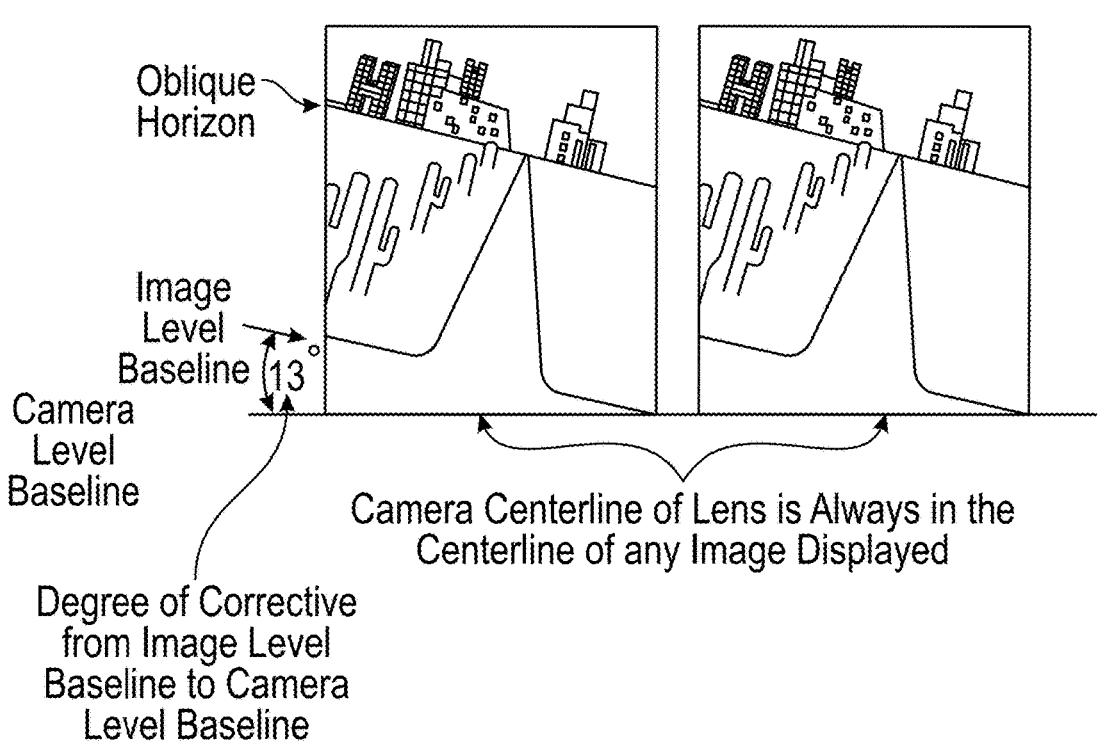

Oblique Horizon

Image Level Baseline 13°

Camera Level Baseline

Degree of Corrective from Image Level Baseline to Camera Level Baseline

Camera Centerline of Lens is Always in the Centerline of any Image Displayed

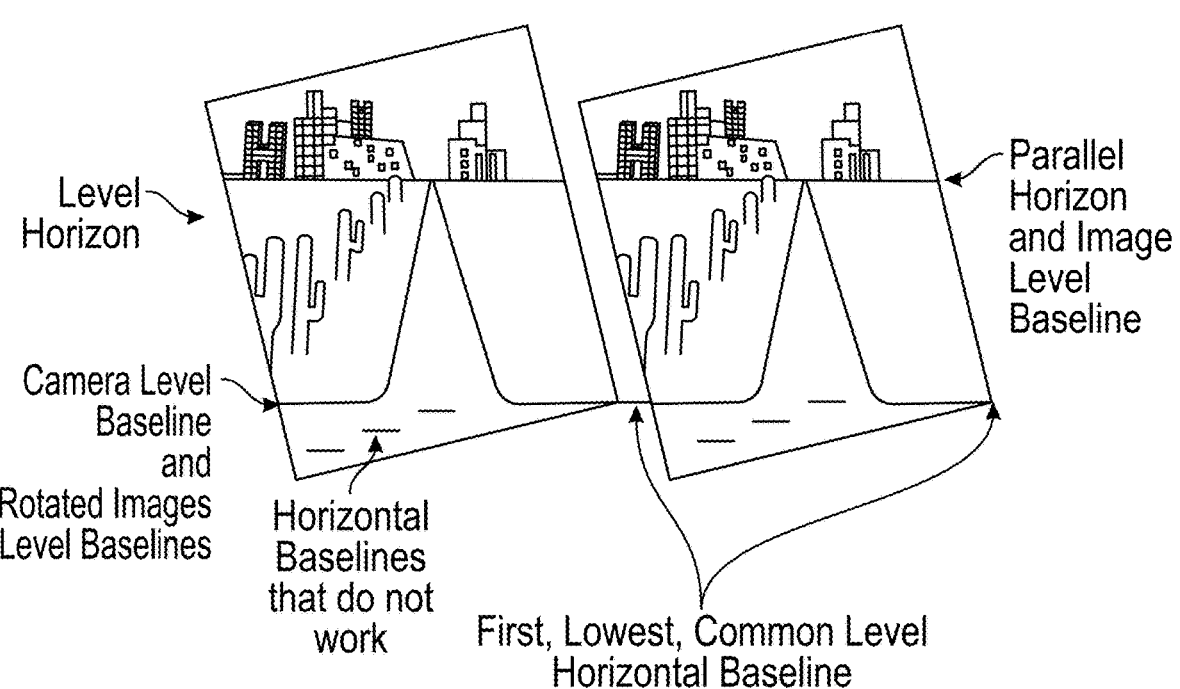

Level Horizon

Camera Level Baseline and Rotated Images Level Baselines

Horizontal Baselines that do not work

First, Lowest, Common Level Horizontal Baseline

Parallel Horizon and Image Level Baseline

FIG. 12B

3D PHOTOGRAPHY AND VIDEOGRAPHY IMAGE CREATOR AND VIEWER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates to a three-dimensional (3D) image creator and viewer for photography and videography.

Description of the Related Technology

Advances in three-dimensional (3D) imaging technology have significantly enhanced the way visual content is created, viewed, and shared. From entertainment to medical imaging and product design, 3D visuals offer greater depth, realism, and immersive experiences compared to traditional two-dimensional (2D) media. However, viewing 3D content often poses challenges for users, particularly when using stereoscopic techniques, which rely on displaying slightly different perspectives to each eye to simulate depth. This method can result in parallax strain, visual discomfort, and/or fatigue, particularly during extended usage.

Existing 3D viewing systems frequently struggle to balance the demands of image clarity, depth perception, and user comfort. Parallax-related issues, caused by misaligned depth rendering and/or poorly calibrated visual cues, are a common source of user dissatisfaction. Prolonged viewing of 3D content can lead to eye strain, headaches, and/or difficulty focusing, reducing the overall usability of such systems. Furthermore, many 3D content creation tools remain overly complex, requiring advanced technical expertise, and can be challenging for casual or novice users to adopt effectively.

SUMMARY OF CERTAIN INVENTIVE ASPECTS

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

One aspect is a method for reducing parallax eye strain when viewing a three-dimensional (3D) image using a stereo image viewer, the method comprising: displaying a 3D image on a stereo image viewer, the stereo image viewer comprising a display, a left lens, and a right lens, the display having a first portion configured to display a left image of the 3D image to a left eye of a user via the left lens and a second portion configured to display a right image of the 3D image to a right eye of the user via the right lens; illuminating a first vertical line on the left lens at a center of the left lens; adjusting a position of the left lens to align the first vertical line illuminated on the left lens with a center of the user's left eye; illuminating a second vertical line on the right lens at a center of the right lens; and adjusting a position of the right lens to align the second vertical line illuminated on the right lens with a center of the user's right eye.

In some embodiments, the method further comprises illuminating a third vertical line at a first registration mark on the left image; adjusting a position of the left image within the first portion of the display to align the third vertical line with the center of the user's left eye; illuminating a fourth vertical line at a second registration mark on the right image; and adjusting a position of the right image within the second portion of the display to align the fourth vertical line with the center of the user's right eye.

In some embodiments, the left image further includes a third registration mark indicating a center of the left image along the vertical axis, the right image further includes a fourth registration mark indicating a center of the right image along the vertical axis, and the method further comprises correcting tilt of the 3D image based on the third registration mark and the fourth registration mark.

In some embodiments, correcting the tilt of the 3D image comprises masking or moving the 3D image to achieve a level baseline for the left image and the right image.

In some embodiments, the method further comprises masking a portion of the left image and the right image; applying a third registration mark at a center of the masked left image along the vertical axis; adjusting a position of the left image within the first portion of the display to align the third registration mark with the center of the user's left eye; applying a fourth registration mark at a center of the masked right image along the vertical axis; and adjusting a position of the right image within the second portion of the display to align the fourth registration mark with the center of the user's right eye.

In some embodiments, the method further comprises determining that a horizon of the 3D image is tilted with respect to the horizontal axis by more than a threshold amount; and correcting the horizon of the 3D image by rotating, elevating, and/or cropping the left image and the right image to provide a common level baseline for the left image and the right image.

In some embodiments, the method further comprises obtaining a camera level baseline indicative of a level baseline of a camera that captured the 3D image; determining a level line from a lowest corner of the lowest one of the left image and the right image based on the camera level baseline; and correcting a horizon of the 3D image based on the level line.

In some embodiments, the method further comprises identifying a first and closest common level horizontal baseline for the left image and the right image; masking the left image and the right image based on the identified common level horizontal baseline; and correcting the horizon of the 3D image based on the masked left image and the masked right image.

In some embodiments, the method further comprises determining an image level baseline representing an oblique baseline of the left image and the right image; obtaining a camera level baseline indicative of a level baseline of a camera that captured the 3D image; and rotating the left image and the right image based on the image level baseline to match a camera level baseline.

Another aspect is a stereo camera system, comprising: a left lens; a right lens; a display having a first portion configured to display a left image of a three-dimensional (3D) image to a left eye of a user via the left lens and a second portion configured to display a right image of the 3D image to a right eye of the user via the right lens; an input configured to receive commands from a user; a processor; and a non-transitory computer readable medium storing instructions that when executed on the processor cause the processor to: illuminate a first vertical line on the left lens at a center of the left lens; adjust a position of the left lens to align the first vertical line illuminated on the left lens with a center of the user's left eye; illuminate a second vertical line on the right lens at a center of the right lens; and adjust a position of the right lens to align the second vertical line illuminated on the right lens with a center of the user's right eye.

In some embodiments, the instructions further cause the processor to: independently move the left image and the right image horizontally within the display to align a first centerline of the left image with the user's left eye and a second centerline of the right image with the user's right eye.

In some embodiments, the stereo camera system further comprises an interface configured to communicate with a mobile device, the interface configured to receive commands from the mobile device to control the stereo camera system.

In some embodiments, the stereo camera system further comprises an interface configured to communicate with a remote control, the interface configured to receive commands from the remote control to control the stereo camera system.

In some embodiments, the stereo camera system further comprises one or more support straps configured to mount the stereo camera system to the user's head.

In some embodiments, the stereo camera system is configured to be held to the user's head without the use of support straps.

In some embodiments, the 3D image was obtained using a different stereo camera system using a first 3D viewing protocol, and the instructions further cause the processor to display the 3D image in accordance with the 3D viewing protocol, the 3D viewing protocol configured to enable display of the 3D images on any compatible system while reducing parallax eye strain.

In some embodiments, the 3D viewing protocol defines: original image centerline registration, creation of a new mask or stereo masked image pair with a new centerline registration, and/or image alignment, movement, recording, data transfer and associated program features.

In some embodiments, the stereo camera system further comprises an auto pupil sensor, configured to detect a position of the user's pupils, wherein the instructions further cause the processor to automatically align the centers of the left and right lenses with centerlines of the left and right images on the display to match the detected positions of user's pupils.

In some embodiments, the stereo camera system further comprises a microphone configured to receive voice commands from the user, wherein the instructions further cause the processor to control the stereo camera system based on the voice commands.

In some embodiments, the instructions further cause the processor to parse the voice commands provided by the user using artificial intelligence.

BRIEF DESCRIPTION OF THE DRAWINGS

The above, as well as additional objects, features and advantages of the present inventive concept, will be better understood through the following illustrative and non-limiting detailed description of embodiments of the present invention, with reference to the appended drawings. In the drawings like reference numerals will be used for like elements unless stated otherwise. In addition, in the drawings, the sizes, dimensions, and/or angles of various elements may not be drawn to scale to better illustrate aspects of the disclosure. The particular sizes, dimensions, and/or angles illustrated in the drawings are merely exemplary and are not limiting to embodiments of the disclosure.

FIGS. 12A-12E illustrate how the 3D viewer can identify the oblique images based on the degree of variance from camera level baseline, and the degree of rotation needed to correct the degree of variance.

DETAILED DESCRIPTION

Figure 1:
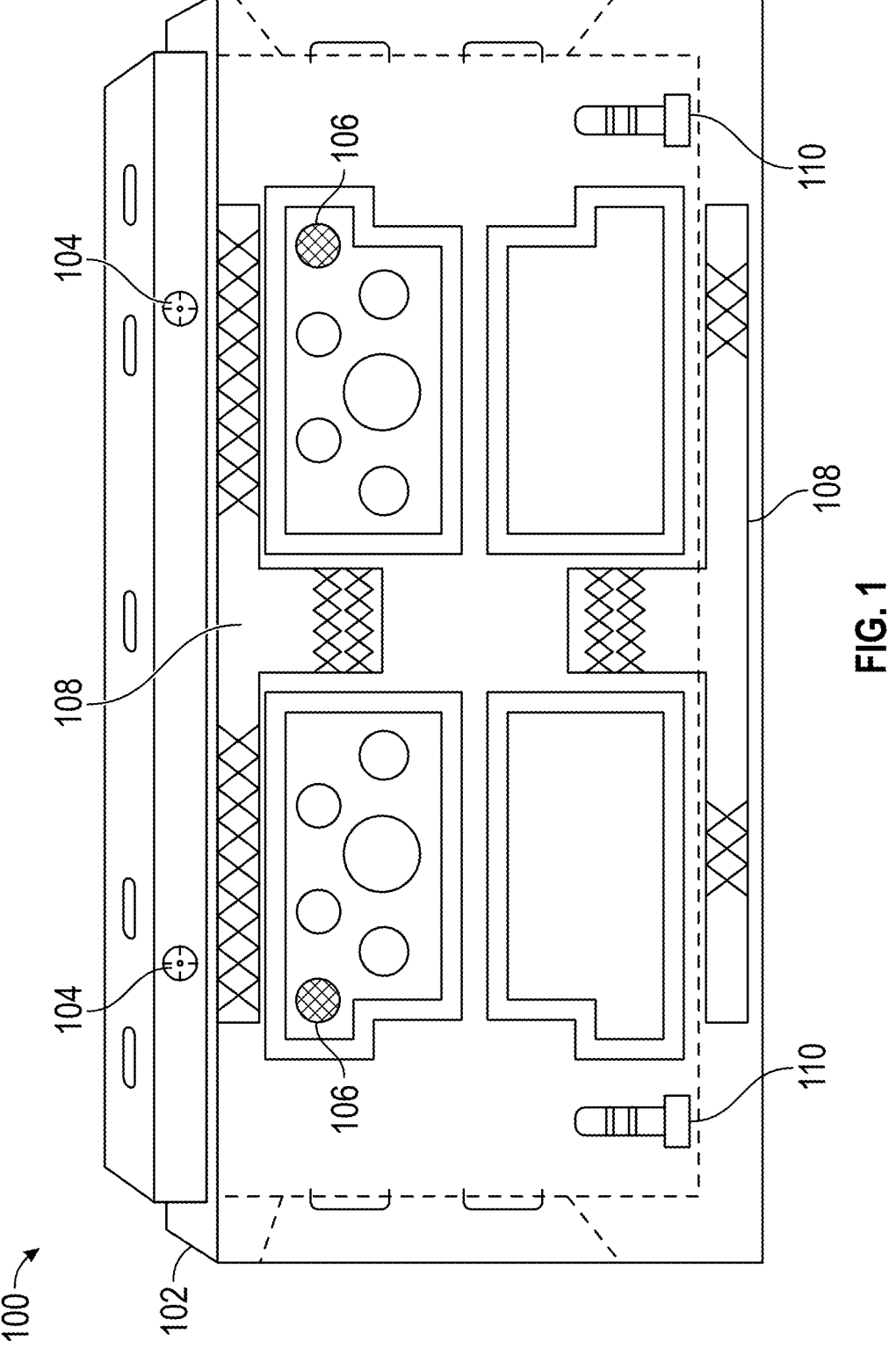
FIG. 1 illustrates an embodiment of a holder in which a mobile phone can be configured to take images that can be used with a 3D viewer.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

3D Photography and Videography Image Creator and Viewer

Aspects of the present disclosure address the challenges outlined in the background section by introducing an innovative 3D image viewer and creator system designed to deliver an immersive and comfortable user experience. Aspects of the disclosure system specifically tackle the issues of parallax strain and user discomfort, which are common in existing 3D viewing technologies. As described in more detail below, the present disclosure ensures accurate depth perception and minimizes visual fatigue, even during extended periods of use.

In addition to improving the viewing experience, aspects of this disclosure provide an intuitive platform for creating high-quality 3D content. Unlike conventional systems that often require extensive technical expertise, the tools and workflows incorporated in this system are designed to be user-friendly, making them accessible to both professionals and novices. The disclosed system bridges the gap between complexity and usability, empowering users to seamlessly create and interact with 3D images and videos without compromising comfort or efficiency. The present disclosure is applicable across various applications and industries and, as detailed below, provides a practical and effective solution for viewing 3D content without experiencing parallax strain.

To display a 3D image, two images, a left image and a right image, are typically displayed, one to each eye of the user. These two images are mostly the same but show the desired view from slightly different perspectives to mimic how a person's eyes perceive depth by being positioned slightly offset from each other. Parallax eye strain may be caused by misalignment of these images with the user's eyes, causing the eyes to compensate and experience strain to create the 3D image.

The present disclosure is related to a method and system for reducing parallax strain when viewing a 3D image. According to embodiments of the disclosed system, a 3D image viewer (such as a mobile phone, camera with view screen, iPad or other tablet, or other digital display), is configured to reduce parallax eye strain by improving the alignment of each optical element with the user's eyes. Although aspects of this disclosure are discussed in connection with particular embodiments of the 3D viewer (e.g., a mobile phone, display screen, etc.), those skilled in the art will understand that the methods and systems can be modified to be implemented on any 3D viewer.

Figure 2:
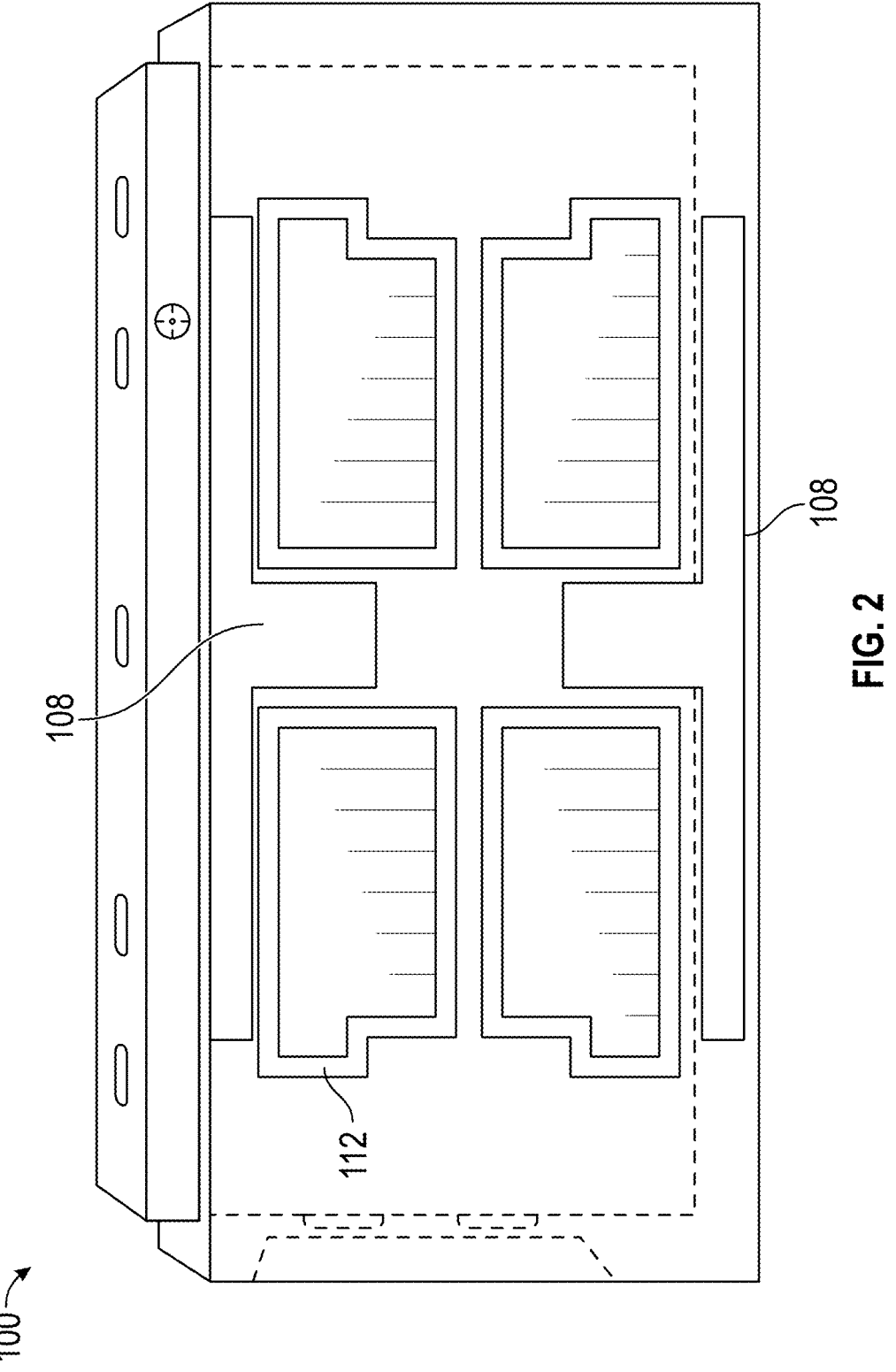
FIG. 2 illustrates an embodiment of the holder of FIG. 1.

FIGS. 1 and 2 illustrate an embodiment of a holder 100 in which a mobile phone can be configured to take images that can be used with a 3D viewer. As shown in FIGS. 1 and 2, the holder 100 can include a housing 102, one or more flash units 104 (e.g., flash bulbs, flash LEDs, etc.), one or more microphone pickups 106, fasteners 108 (e.g., Velcro® fabric or another hook-and-loop fastener), connection plugs 110, and one or more lens covers 112. In some embodiments, the holder 100 has Velcro® tabs forming the fasteners 108 that are sewn to a mesh fabric exterior. The lens covers 112 may have snap-in tabs made of rubber or synthetic material with a mesh fabric backing. The lens covers 112 can include one or more lens caps that can have a flexible hinge which allows the lens cap(s) to be rotated 180 degrees to be opened or closed.

Figure 3:
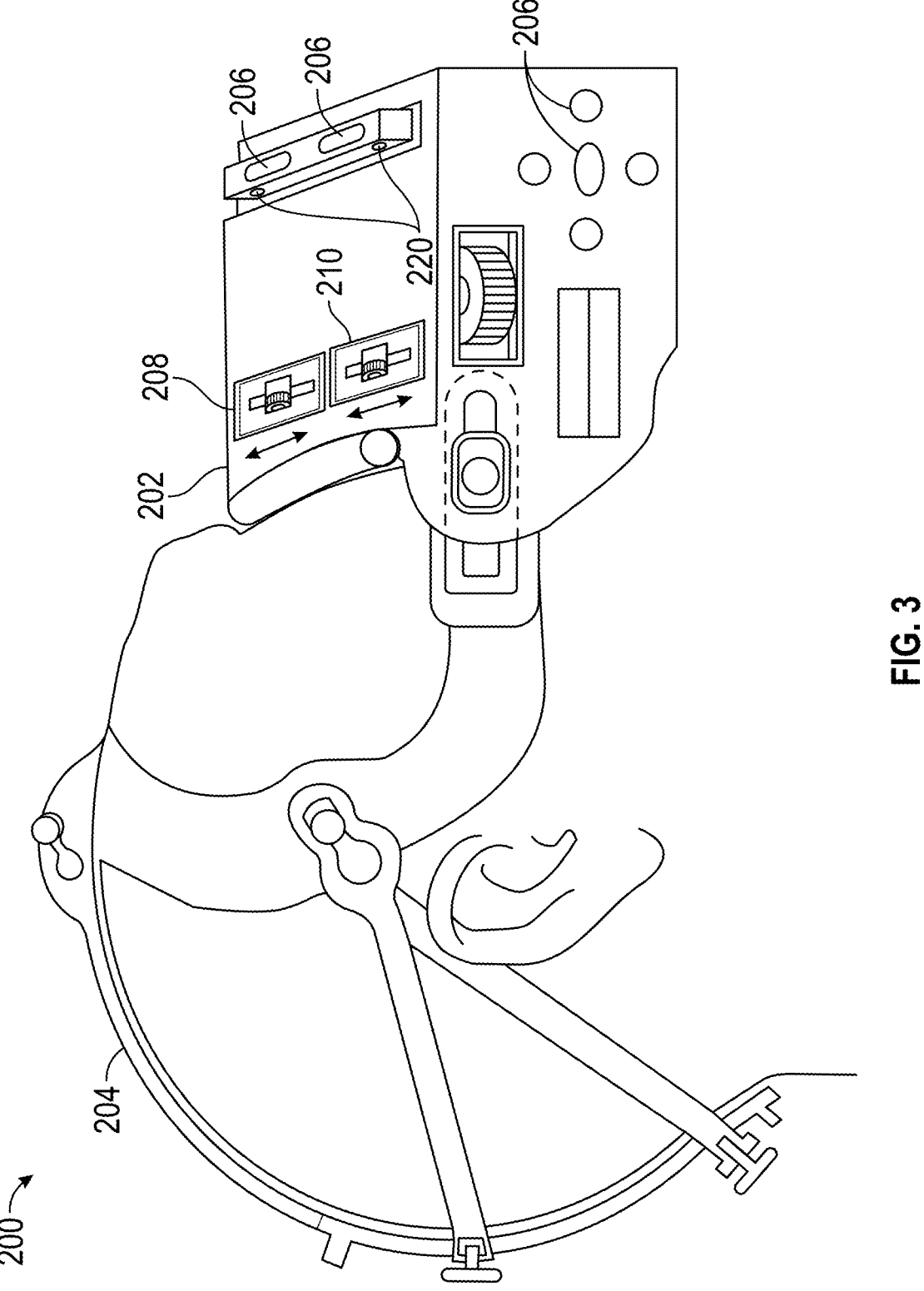
FIG. 3 illustrates an embodiment of a 3D viewer that is configured to be worn on the user's head.

FIG. 3 illustrates an embodiment of a 3D viewer 200 (also referred to as a stereo image viewer) that is configured to be worn on the user's head. The 3D viewer 200 includes a housing 202, one or more support straps 204, a plurality of inputs 206 (e.g., menu and select buttons), a left eye align input 208, a right eye align input 210, and one or more speakers 220.

Figure 4A:
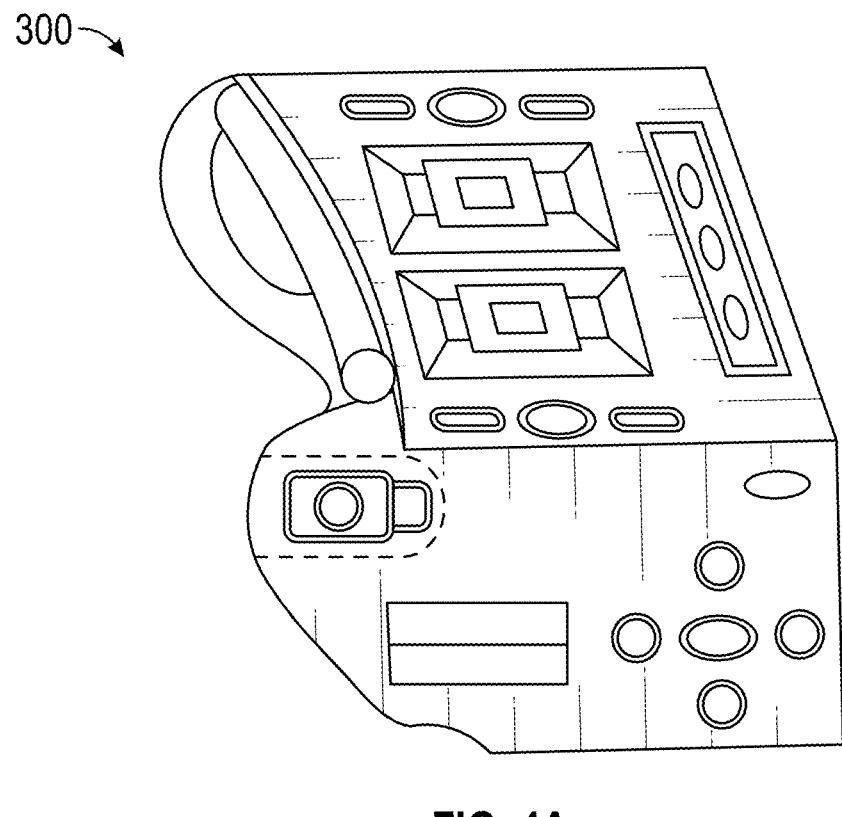
FIGS. 4A and 4B illustrate embodiments of 3D viewers that can be handheld.
Figure 4B:
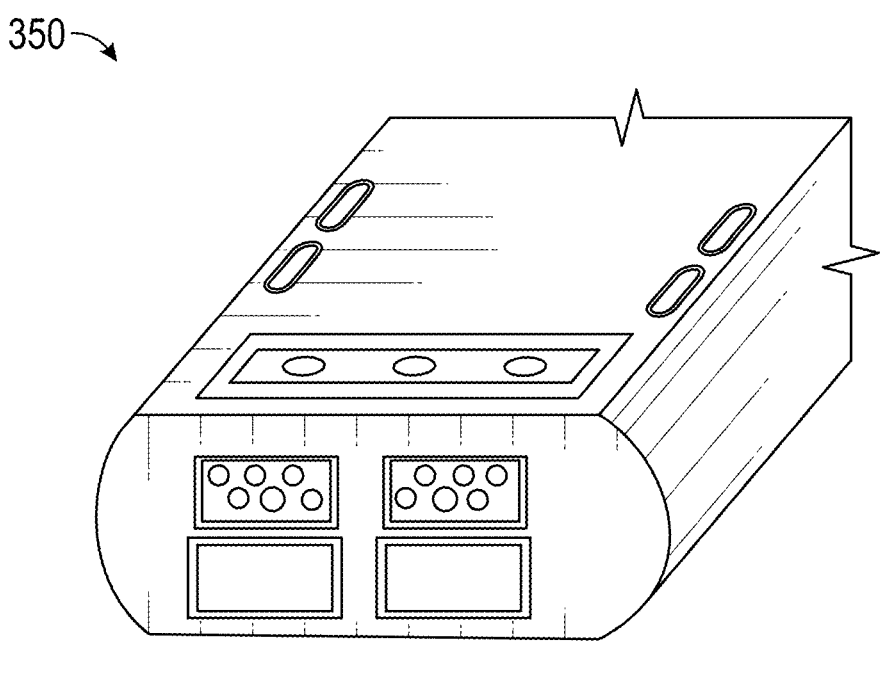

FIGS. 4A and 4B illustrate embodiments of 3D viewers 300, 350 that can be handheld. In the embodiment of FIG. 4A, the 3D viewer 300 may be similar to the 3D viewer 200 of FIG. 3 with the support straps 204 detached from the 3D viewer 300. This handheld 3D viewer 300 may be useful for fast review of 3D photography, by enabling the user to bring up the 3D viewer 300 to their eyes to review 3D images shortly after capturing the 3D images. Those skilled in the art will recognize that embodiments of the 3D viewers 100, 200, 300, 350 described herein can include a processor and a non-transitory memory with instructions (e.g., software) or other dedicated hardware configured to perform that various functions described herein.

In the embodiment of FIG. 4B, the 3D viewer 350 is configured to enable stereo camera lens and sensors to align with openings in a fascia of the 3D viewer 350. This enables a user to take photos and/or video while using the 3D viewer 350. In some embodiments, the 3D viewer 350 may have hinged or sliding caps to cover the 3D viewer's 350 lens openings.

The 3D viewer 200 may have a left lens and a right lens for displaying the left image and the right image, respectively. The 3D viewer 200 may be configured to adjust a position of a center of the left lens to align the center of the left lens with a center of the user's left eye. The 3D viewer 200 may also be configured to adjust a position of a center of the right lens to align the center of the right lens with a center of the user's right eye. After the user has set the viewer lens to the centerline of each eye, the user can then set the left and right image centerlines on the (e.g., phone image displays) to match the centerlines of the user's eyes and focus lens's." Thus, optimal, stress-free viewing can be accomplished by having the center line of each optical element aligned perfectly, vertically and horizontally. These optical elements can include the user's eyes, the lenses of the 3D image viewer, and the images themselves appearing on the phone screen.

With reference to FIG. 3, the 3D viewer 200 can be configured to receive user commands for adjusting the positions of the left and right lens via the left eye align input 208 and the right eye align input 210. In some embodiments, the left eye align input 208 and the right eye align input 210 can include mechanical connections to the left lens and the right lens such that moving the left eye align input 208 and/or the right eye align input 210 directly moves the left lens and/or the right lens. In other embodiments, the left eye align input 208 and the right eye align input 210 can generate signals that can be used by the 3D viewer 200 to control one or more motors to move the left lens and/or the right lens. In some embodiments, the signal that is used to control one or more motors may also communicate the horizontal and vertical location of each eye/lens centerline to the phone/viewer displays, both left and right, to automatically align the centerline of each display image, both left and right, to their respective eye-lens-centerlines.

In some embodiments, horizontally setting the center line of each lens in the viewer to the center line of the users' eyes may be achieved by moving the lens to the farthest position and activating the center line of the lens, which illuminates a vertical line on the lens in the center of the lens. For example, the 3D viewer 200 can include an emitter (for example, an LED or other light emitter) configured to generate the vertical line. In some embodiments, each viewer lens can include a corresponding emitter configured to be activated by a button or other input on the 3D viewer 200 or via remote control. When activated, the illuminated vertical line assists the 3D viewer 200 with aligning the lens center line to the viewer's eye center line by moving the lens assembly horizontally, right or left, until the illuminated vertical line and the center of the user's eye aligns while the user is looking straight ahead. In some embodiments, movement of the left and right lenses can be performed in response to receiving user commands via the left eye align input 208 and the right eye align input 210.

In some embodiments, the 3D viewer 200 can further include one or more sensors configured to automatically measure a center line of each of the user's pupils. For example, the sensors can include cameras or other visual sensors that can detect the locations of the user's pupils. In some embodiments, the 3D viewer 200 can perform an automatic function using pupil centerline data to move the (focus) lens to the centerline of each of the user's eyes, and/or connecting to the phone/camera displays to align the stereo images centerline to the eye-lens centerlines. The 3D viewer (e.g., phone or image device) display centerlines can be (internally) illuminated on the screen for both the left and right images. The user can manually adjust each illuminated image centerline to the eye-lens centerline or the viewer can in some embodiments, automatically adjust the image centerlines to their respective eye-lens centerlines.

The 3D viewer 200 can be configured to communicate, either via a physical or wireless connection, the measured center lines of the user's pupils to the mobile phone (or any other viewer). The mobile phone can then automatically adjust each stereo image camera lens center line to the individual pupil center lines of the user. In some embodiments, these automatic settings can be over ridden by user, to enable fine adjustments if desired. All settings can be saved under a user number for communication to, and use in, the program settings of the 3D viewer 200.

When this alignment is achieved, the distance between the center lines for the right lens and the left lens can be recorded/saved as the user's interocular distance (IOD) or interpupillary distance (IPD). The 3D viewer 200 may then automatically align each image center line to match the user's saved IOD, as discussed in more detail below. This can be done for all stationary pictures, as well as for video and any other image. In some embodiments, these IOD settings may be recorded for each eye and each user, which means that images can be aligned with users' eyes after the alignment procedure is performed once per user. Thus, in some embodiments, after the initial use, the individual user can select their user number, enabling all images viewed using the 3D viewer 200 to be adjusted automatically to their specific saved individual IOD settings.

In some embodiments, the 3D viewer 200 of images on a phone screen may also be configured to align a center of each of the left image and the right image with the center of the left lens and the right lens, respectively. Thus, two adjustments may be made for each eye. The first, which is discussed above, involves adjusting a position of the lens to align the lens with the eye. The second adjustment involves illuminating a vertical, clearly-defined line on a contrasting background that appears on both sides of the phone screen. The line may be red, black, or any other color, and the background may be a light-colored background or another color that contrasts with the line. The user can move this line left or right to visually match with the center line on the lens. Once aligned, the position for the images, both right and left, can be saved as well so that all subsequent image and video viewing can be automatically aligned. This helps to prevent parallax eye strain by avoiding situations where the eyes must compensate for misalignment of the images.

Thus, in some embodiments, the images used for display can have invisible registration marks to indicate the horizontal and vertical center lines of the images. In some embodiments, the registration marks can be stored as metadata associated with the images rather than be incorporated into the image data itself. The registration marks may be recorded at the time of taking the video or picture or may be added later. This precise registration data allows the program to match the user's data, (e.g., individual eye IOD), to the center line of any images viewed by that user. The center line for the image, based on the lens centerline, may be captured at the time the photo or video is taken.

As mentioned above, in some embodiments, the user can make any final fine alignment settings by activating the image center line actually "within" the image. This allows those images with the recorded center line to illuminate the line vertically within the image, rather than projecting the line onto or into the image. Activating the center line image light may occur for one or both of the right and left images. This vertical center line light helps the user make sure that the eyes, the lenses, and the images are all lined up, both for the left and the right.

In some embodiments, a mobile phone may be configured to take the images needed for use with the 3D viewer 200. For example, the 3D viewer 200 can be used as a holder to hold or house the mobile phone when capturing and/or viewing 3D images. In some embodiments, the mobile phone may comprise a 3D image setting that is selectable by the user. When selected, the 3D image setting may cause the mobile phone to take two images at the same time from slightly different perspectives. These images can later be displayed on a mobile phone or other 3D viewer 200 or other 3D viewing devices. When taking the images with the mobile phone, the phone may display just one of the images, but when viewing the image on the phone in a 3D mode, the phone screen may be configured to split into two separate areas that display the two slightly different views. When viewed through the 3D viewer 200, the user will see one 3D image.

Many other features may be incorporated into the 3D viewer 200. For example, the 3D viewer 200 may include buttons which allow different images to be viewed. The 3D viewer 200 may include a menu bar that allows for navigating between images and selecting different settings and apps. In addition, the user may be able to adjust the photo brightness, call sound volume, music, etc., as well as scroll to a new folder, file, date, or other stored or streaming data.

The 3D viewer 200 may also be used to view 2D images and videos. In some embodiments, this can be done simply by presenting the same image to both the left and right lenses. Thus, this singular data stream is distributed to both sides as individual content and adjusted for overlap to produce a singular picture or video.

Correcting Horizontal Tilt of a 3D Image

One source of parallax-related issues that can occur when viewing 3D images is misalignment of the horizontal axis In some embodiments, the 3D viewer 200 also comprises precise registration marks for the vertical axis. These registration marks allow the program to precisely measure the level baseline of an image. Pictures taken at an angle can cause some unintended visual 'distortion' when viewed. This is particularly true with 3D viewing. In some embodiments, the disclosed 3D viewer 200 can evaluate a common or first level baseline elevation that can be displayed as a level foreground, even if the picture was taken at a tilt or angle. This enables the 3D viewer 200 to correct an oblique horizon in the 3D image.

In some embodiments, the user may initiate a correction to the tilt of any image pair by indicating to the 3D viewer 200 that correction is needed. The 3D viewer 200 may then calculate a first level image baseline by masking or moving the image as needed to achieve the first (closest) level baseline 3D image of both combined images.

In some embodiments, the 3D viewer 200 can compare the camera level baseline to a horizontal level horizon and foreground to generate an image level baseline. As used herein, the image level baseline may generally refer to the degree of tilt that can be applied to an image to correct an oblique foreground and horizon. As used herein, the camera level baseline may generally refer to a level line whose origin elevation is determined by the lowest corner of the lowest image, of a stereo pair, level across the bottom of both images.

The 3D viewer 200 can measure the vertical scale difference between the lowest corner on the lowest image to the highest (e.g., bottom) corner on the highest image. The degree of tilt that can be used to correct the oblique foreground to camera level baseline may simply be the degree of tilt used to move the camera's horizontal base, to a level based on the lowest corner elevation of both capture lenses when the images were recorded. The program can then automatically adjust all the images to the image level baseline. Advantageously, the user does not need to select or adjust the baseline adjustment since this can be handled by the 3D viewer 200.

In some embodiments, correcting the tilt of a 3D image can include masking or moving the 3D image to achieve a level baseline for the left image and the right image of the 3D image. This can include masking a portion of the left image and the right image. The 3D viewer 200 can apply a third registration mark at a center of the masked left image along the vertical axis and adjust a position of the left image within the first portion of the display to align the third registration mark with the center of the user's left eye. Similarly, the 3D viewer 200 can apply a fourth registration mark at a center of the masked right image along the vertical axis and adjust a position of the right image within the second portion of the display to align the fourth registration mark with the center of the user's right eye.

Figure 12C:
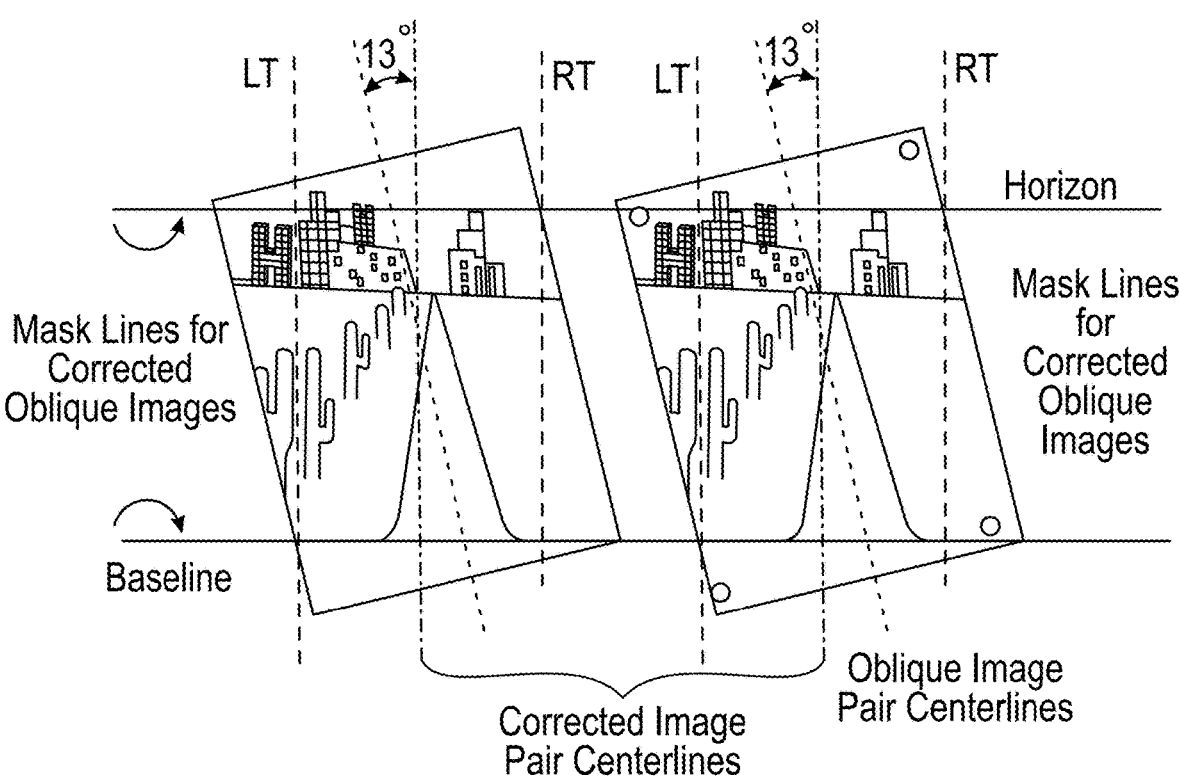
Figure 12D:
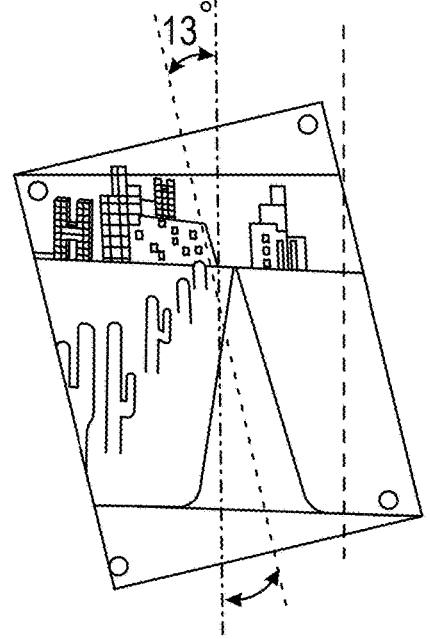
Figure 12E:
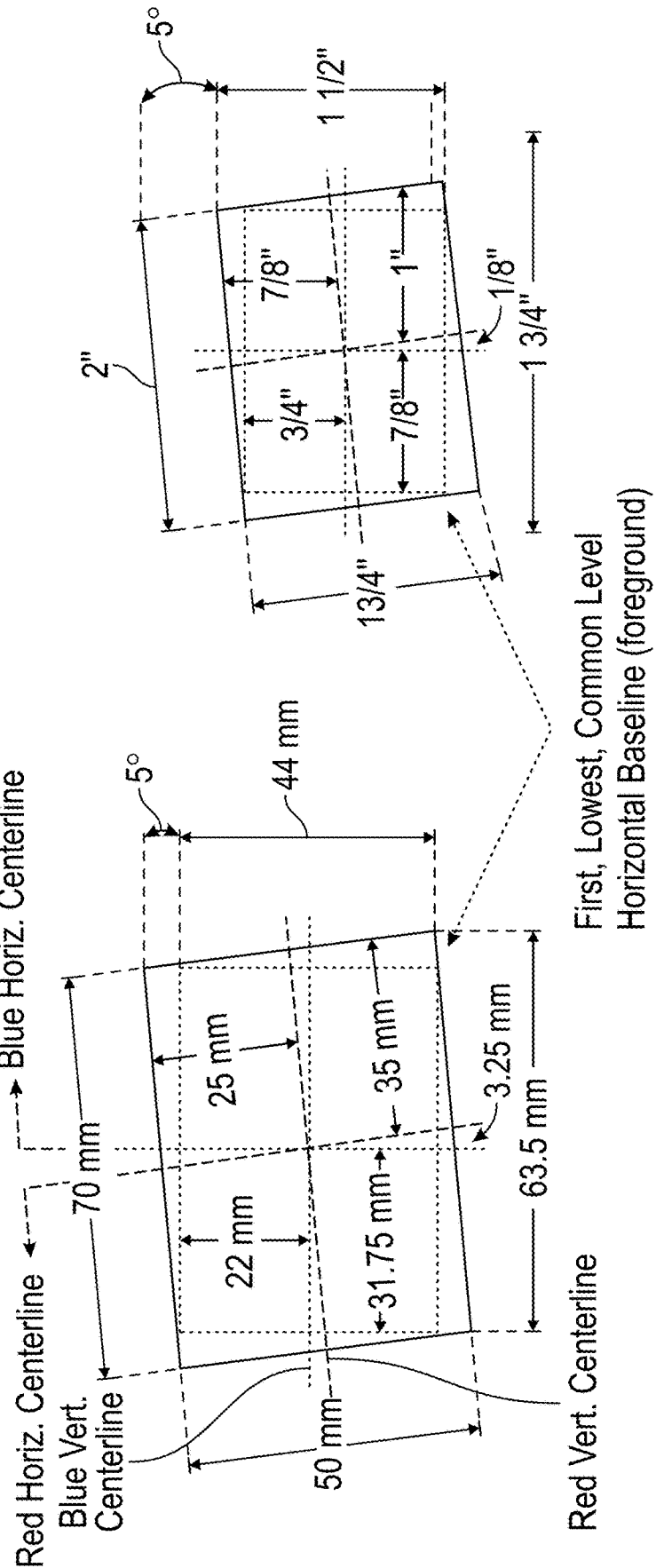

In some embodiments, oblique horizon correction can include the 3D viewer 200 determining that a horizon of the 3D image is tilted with respect to the horizontal axis by more than a threshold amount. The 3D viewer 200 can correct the horizon of the 3D image by rotating, elevating, and/or cropping the left image and the right image to provide a common level baseline for the left image and the right image. This is shown in FIGS. 12B-12D, discussed below.

The 3D viewer 200 can also be configured to use a camera level baseline in correcting the horizon of a 3D image. For example, the 3D viewer 200 can obtain a camera level baseline indicative of a level baseline of a camera that captured the 3D image. The 3D viewer 200 can then determine a level line from a lowest corner of the lowest image to the highest (bottom) corner of the highest image. The determined level line can be used as the degree (e.g., scale) of tilt or the adjustment used to adjust the oblique image level baseline, to camera level baseline.

In some embodiments, the 3D viewer 200 can be configured to correct the horizon of a 3D image by identifying a first and closest common level horizontal baseline for the left image and the right image and masking the left image and the right image based on the identified common level horizontal baseline. The 3D viewer 200 can then correct the horizon of the 3D image based on the masked left image and the masked right image.

In some embodiments, the 3D viewer 200 can be configured to rotate the 3D image to match a camera level baseline by determining an image level baseline representing an oblique baseline of the left image and the right image and obtaining a camera level baseline indicative of a level baseline of a camera that captured the 3D image. The 3D viewer 200 can then rotate the left image and the right image based on the image level baseline to match the camera level baseline. In some embodiments, the image rotation can result in both images being masked to eliminate unused imagery.

When viewing 3D images on a 3D viewer 200, the user can mask a specific area of a 3D image by using a menu/mask size feature. The mask size feature enables the user to select the upper mask and bring it down to selected area on the 3D viewer 200. Then the user can select the bottom mask and bring it up to selected area on the 3D viewer 200. A similar procedure can be applied to the left and right edges of the selected 3D image.

When finished, the user can save the 3D area selected and enlarged the 3D area to full screen. When the area is enlarged to full screen, the user can scroll to any area on the 3D image to enlarge a specific area of the image if allowed by program performance parameters or scroll back to the adjusted size image. Adjusted image may be saved to file independent of original unadjusted image while in viewer mode.

In some embodiments, each image and video will be aligned with the center line of the lenses taking the images using the horizontal and vertical invisible registration marks discussed above. This allows any image or video to be automatically adjusted to any user's specific IOD, or IPD saved user number. In addition, in some embodiments, images and videos may be shareable with other users to allow others to see the same images and videos. As these images and videos are shared, they can be automatically adjusted to the individual viewing the shared images and videos. This can be accomplished using the users' saved IPD settings so that anyone can view another user's images automatically without additional adjustments other than the automatic adjustments to the user's settings, thus avoiding unnecessary parallax eye strain.

Other uses for the presently disclosed 3D viewer 200 will be apparent to one of skill in the art. For example, the 3D viewer 200 may be used to display ads and other advertising in 3D. As another example, sports broadcasts may be viewable in 3D using the 3D viewer 200. Further examples include entertainment displays, music videos, classroom science, surgical procedures and may other options may be viewed in 3D using the 3D viewer 200. By providing the necessary automatic program registration, common formatting, and playback, all of these uses become possibilities. The 3D viewer 200 can be configured to automatically adjust all images and videos to a specific user's IOD.

Aspects of the disclosure relate to a 3D viewing protocol that can be used by a 3D viewer 200 to make different images and videos broadly accessible regardless of the device used to capture and/or display the 3D images. Because 3D capture and viewing systems can employ various camera lens arrangements with different center lines and values, 3D images may not be natively compatible among different 3D systems. By using the disclosed 3D viewing protocol, these differences can be overcome while reducing parallax eye strain. The lens center lines and accompanying horizontal and vertical registration marks generated when recording 3D images can allow the center line of any IOD lens arrangements to be matched to the viewers IOD automatically, in the viewer's phone/camera. In some embodiments, the 3D viewing protocol can define original image centerline registration, creation of a new mask or stereo masked image pair with a new centerline registration, and/or image alignment, movement, recording, data transfer and associated program features.

Advantageously, any phone/camera and/or camera with a phone like display screen can be made to any design or style the manufacture may desire, including any unique Head Mounted or Hand-Held Viewer, and display 3D images according to aspects of this disclosure by following the 3D viewing protocol.

In some embodiments, the 3D viewer 200 includes a Range Finder feature. The Range Finder allows the user to place a 'focus target' symbol on an item in the photo field and then focus on the selected target. Once the selected target has been focused, the user can then press 'measure', and determine the distance from the camera to the target. This distance may be recorded with an associated image data file (e.g., stored in metadata associated with the image data file). This range finder value may also include GPS coordinates for the camera location or the target location in the image data file. The Range Finder values may allow the target to be generally measured for distance to the target or other scale measurement.

The 3D viewer 200 may also enable accessing 3D virtual images and videos in a library that can be mixed with natural 3D images and/or video to add interest and creativity to file creation. Users of the 3D viewer 200 may also choose to share images and videos with other people, whether they also have access to the 3D viewer 200 or not. For people with conventional phones, the shared image or video may only be one of the two images that make up the 3D image, or the two images may be combined into a widescreen image or single screen image. Thus, in some embodiments, when taking a 3D image with a phone or camera in 3D mode, the phone or camera may work in a manner similar to other touch screen phones and cameras because the image the user sees on the phone screen is a single wide screen photo of the area the camera is focused on. This is the same image that can be shared with other non-3D viewer 200 users discussed above, or either the left or right lens image can be shared. These two images can both be shared as well, so that the two images can be displayed simultaneously to provide a 3D image when viewed on the phone or other viewer in conjunction with the 3D viewer 200 and 3D viewer protocols.

In some embodiments, when a user is viewing an image on a phone in 3D mode, using the 3D viewer 200, or using another 3D display device, the display screen on the phone displays two separate screens with a right image and a left image. The program within the phone or other 3D viewer 200 automatically aligns the captured image center line of each of the right image and the left image to the chosen IOD or IPD of the current user, as discussed above. Specifically, the user can set the center line for each eye by looking straight ahead and moving the vertical line, which is a movable digital line on an otherwise blank illuminated background, horizontally right or left until the line aligns with the viewer's eye when the viewer is looking straight ahead. In some embodiments, the IOD measurement is the distance between the left center line and the right center line. In some embodiments, the IOD refers to more detailed measurements that take into account the values for both eyes. Once saved and selected, the eye center line data for both eyes of that specific user are used to align all viewed data to that particular user's saved IPD setting.

In some embodiments, the personal IOD, IPD data can be used to access the same settings on different 3D viewers, including when the 3D viewer 200 is implemented on a phone or camera. When one phone is linked through Bluetooth or another communications link to another phone, the settings and data saved to the first phone can be shared with and saved to the second phone/3D viewer 200.

Thus, all material created and accessed using the 3D viewer protocols through the phone or other 3D viewer, whether downloaded from the internet, received from another user, or created with the phone camera or other 3D viewer 200 device itself, can be automatically adjusted to any specific user's IOD regardless of the IOD of the capture camera lenses because all images and videos will have registration marks as discussed above, thus allowing those images to be placed automatically in alignment with the user's IOD or IPD settings.

In some embodiments, the phone/camera or other 3D viewer 200 is also configured to automatically crop the right image and the left image to remove any portion of each image that is not part of the other image. Thus, this auto-crop function masks any image area in the right image that does not appear in the left image and any image area in the left image that does not appear in the right image. This avoids the presence of portions of the image displayed that are not 3D.

In some embodiments, the phone/camera or other 3D viewer 200 either does not display the masked areas or just blacks that area out to form an image mask border or frame for the user's particular 3D field of view. Although the IOD, image focal distance, and field of view may vary only slightly from one user to another, the precise image alignment disclosed herein makes the 3D images viewed, visually unique and custom for every user.

In some embodiments, the 3D phone/camera or other 3D viewer 200 may also be controlled by a remote control provided as an accessory to the 3D viewer 200. Remote operation allows control of the phone program. The remote can be used with the viewer or without. Using the remote allows taking pictures with the remote and can access all programs within the phone as well as the selection buttons on the viewer or the selection buttons on the phone/camera itself. The remote control via Bluetooth, or another wireless communication standard, adds ease of access of programs and displays on the 3D viewer 200 when user does not wish to use control buttons on the 3D viewer 200 or phone. Many additional implementations are possible.

In some embodiments, the 3D viewer 200 can include a microphone configured to receive voice commands from the user. The 3D viewer 200 can be configured to be controlled based on the voice commands received from the user. In some embodiments, the 3D viewer 200 can be configured to parse the voice commands provided by the user using artificial intelligence, such as an artificial intelligence assistant. For example, the user may provide a voice command such as "show me the beach pies from last week". The artificial intelligence assistant can be configured to locate and displays the requested images or videos of pies from the requested timeframe.

Aspects of this disclosure also relate to the capture of 3D images of objects with a full 360 view. For example, a 3D stereo camera can be used to capture a 3D image of an object (e.g., a car or person) all the way around the object. The 3D camera can be configured to provide a rotatable 360-degree feature which allows the user to rotate the combined 3D images of the object into one image that can be rotated all the way around to give the user a full 360-degree 3D view of the combined image.

In some embodiments, the 3D viewer 200 can include a sensor configured to record and communicate where the user sets a centerline of each of the user's left and right eyes. Once set, the 3D viewer 200 can communicate with a phone/camera via Bluetooth or an electronic connection, such that the view screen on the phone/camera automatically adjusts the camera center line of lens on the stereo images to match the user's set center line of each eye. The user can manually adjust either the focus lens center line or the image center line for fine tuning of both alignment and focus if needed.

Creating New Centerlines

In some embodiments, the 3D viewer 200 can be configured to enable the user to create new image centerlines for 3D images. For example, the user can initiate a mask program to create a custom mask a specific area of a stereo image pair or single image that does not include the original centerline of the original image in the center of the newly masked image. The 3D viewer 200 can then establish and record a new image centerline in the image data to be used to move the new image(s) centerline to match the centerlines of the user's eyes.

In one example, an original image (e.g., a 8.5×11 inch photo) can have an original centerline located at 5.5″ from the left, lower corner measured in inches. The user can select three newly masked area centerlines. As outlined below, the 3D viewer 200 can determine, record, and embed newly masked image centerline data, and use the newly masked image centerlines to move the new image centerline, or new stereo image centerlines, to match the centerlines of the user's eyes.

As an initial step, the 3D viewer 200 can generate a first masked area, for example, in the center of a photo. In the newly masked image, the center of the new mask may not match the original image centerline. Thus, the 3D viewer 200 can generate a new mark centerline for the first masked area at substantially the middle of the first masked area. This new centerline can then be recorded with the new masked image and the new centerline can be used to align the centerline of the first masked area to the centerlines of user's eyes.

This process can be performed for a plurality of masked areas selected from the original image. The 3D viewer 200 can record each new original image or masked image centerline to align each and every image to the centerlines of the user's eyes when displayed on the 3D viewer 200.

Figure 5A:
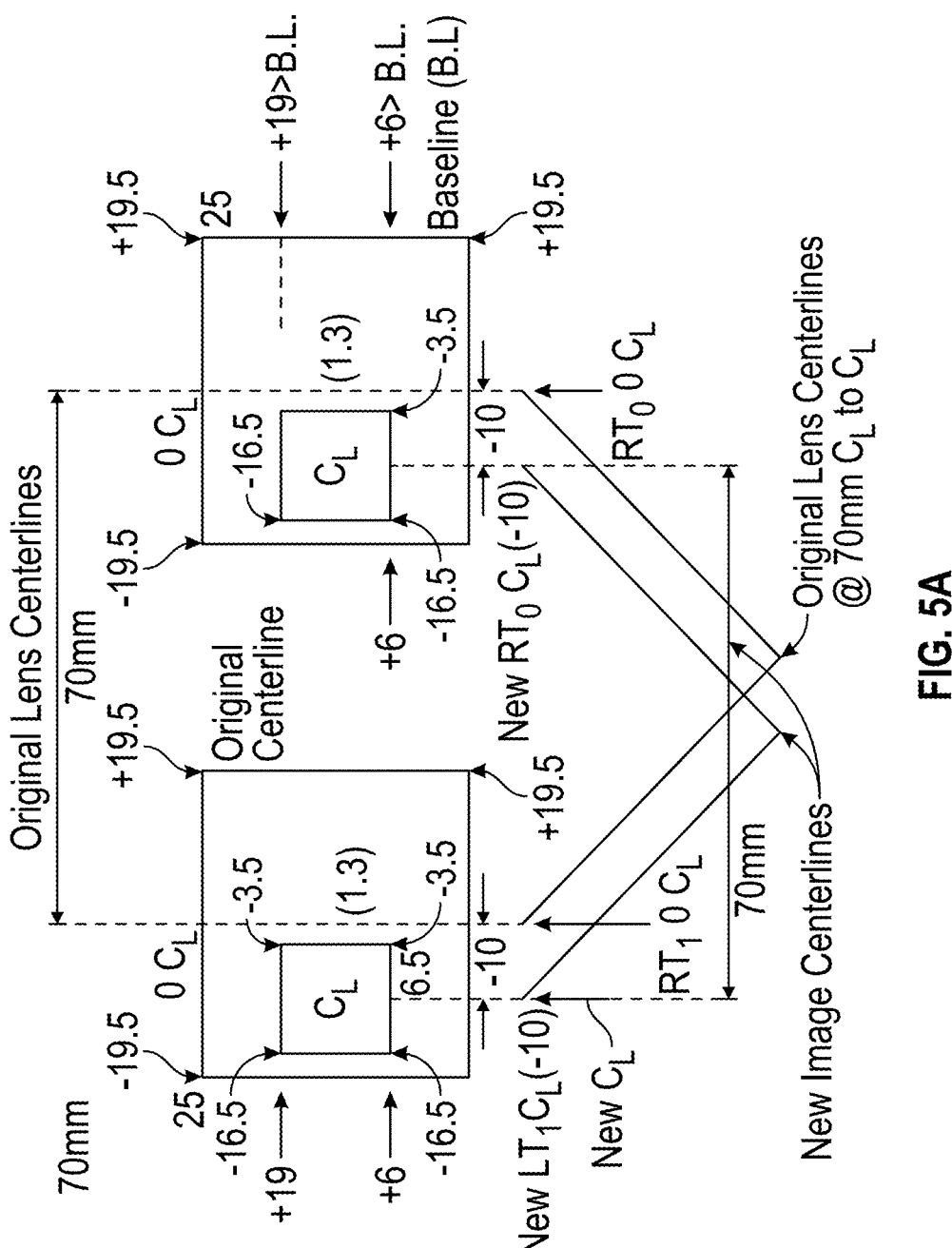
FIGS. 5A-5E illustrate stages in a process for creating masks from an image, recentering the masked images, and enlarging the masked images.

FIGS. 5A-5E illustrate stages in a process for creating masks from an image, recentering the masked images, and enlarging the masked images. As shown in FIG. 5A, a user can create new masks from an original image. The user's IPD may be set at saved value which may be different from the centerlines of the newly masked images. In one example, the user may have an IPD of 50 mm and the new centerlines may be spaced apart by 70 mm.

In the example of FIG. 5A, values for the lower right, lower left, upper right, and upper left corners of the masked image are illustrated. Measurements may be taken from the original lens centerlines. The example of the masked image may have a height of 13 mm, a width of 13 mm, resulting in a centerline at 6.5 mm from the edges of the masked image. The original image may have a height of 25 mm, a width of 39 mm, and a centerline at 19.5 mm from the edges of the original image. Both newly masked centerlines a—10 mm left of the original lens centerlines. Masking may be performed on a single side, with auto-masking used for the other side.

Figures 5B, 5C:
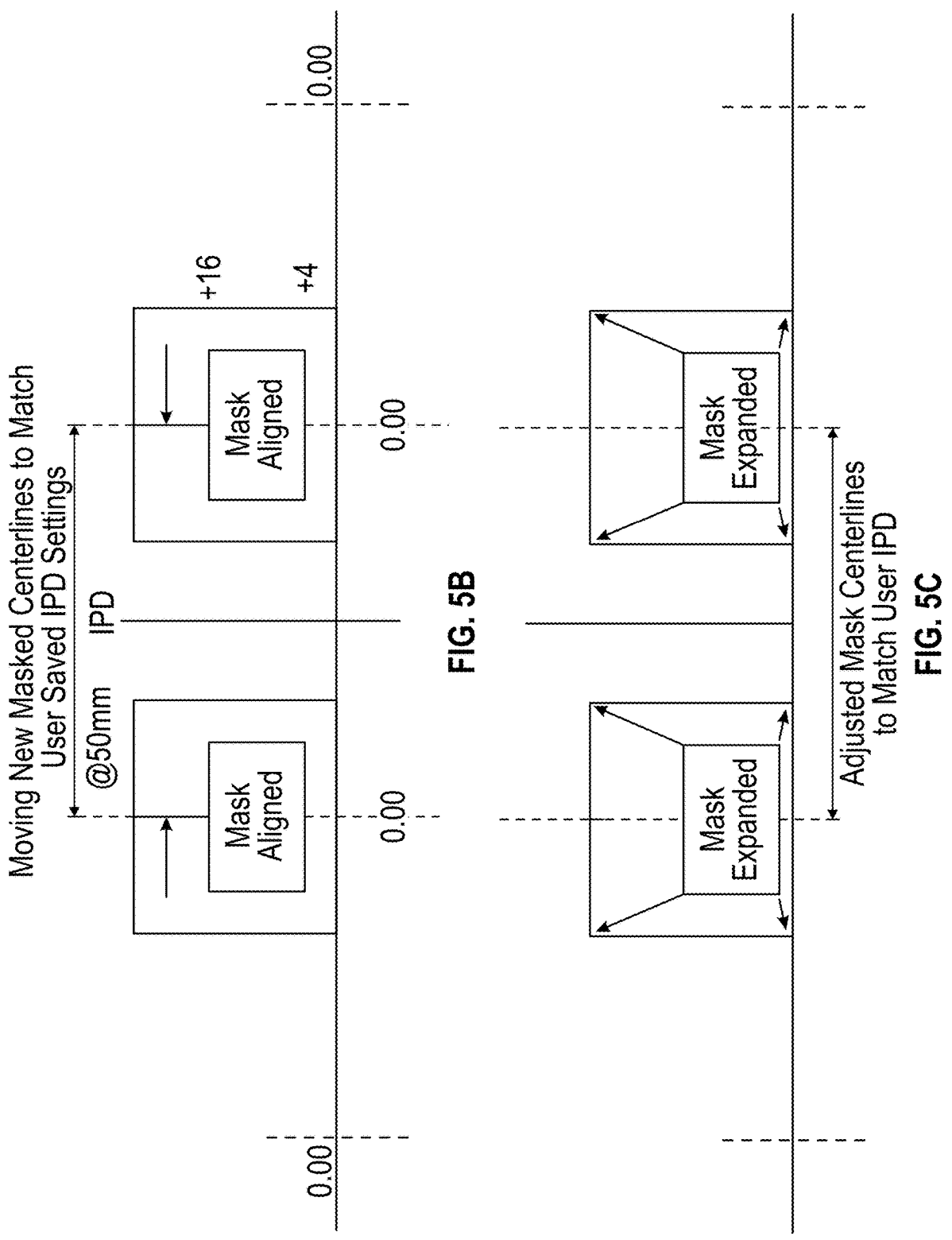

With reference to FIG. 5B, after the new mask images have been saved, the 3D viewer 200 can move the masked image centerlines to match the user's saved IPD settings. In the context of the earlier example, the centerlines of the masked images can be moved such that the centerlines are spaced apart by 50 mm.

Figure 5D:
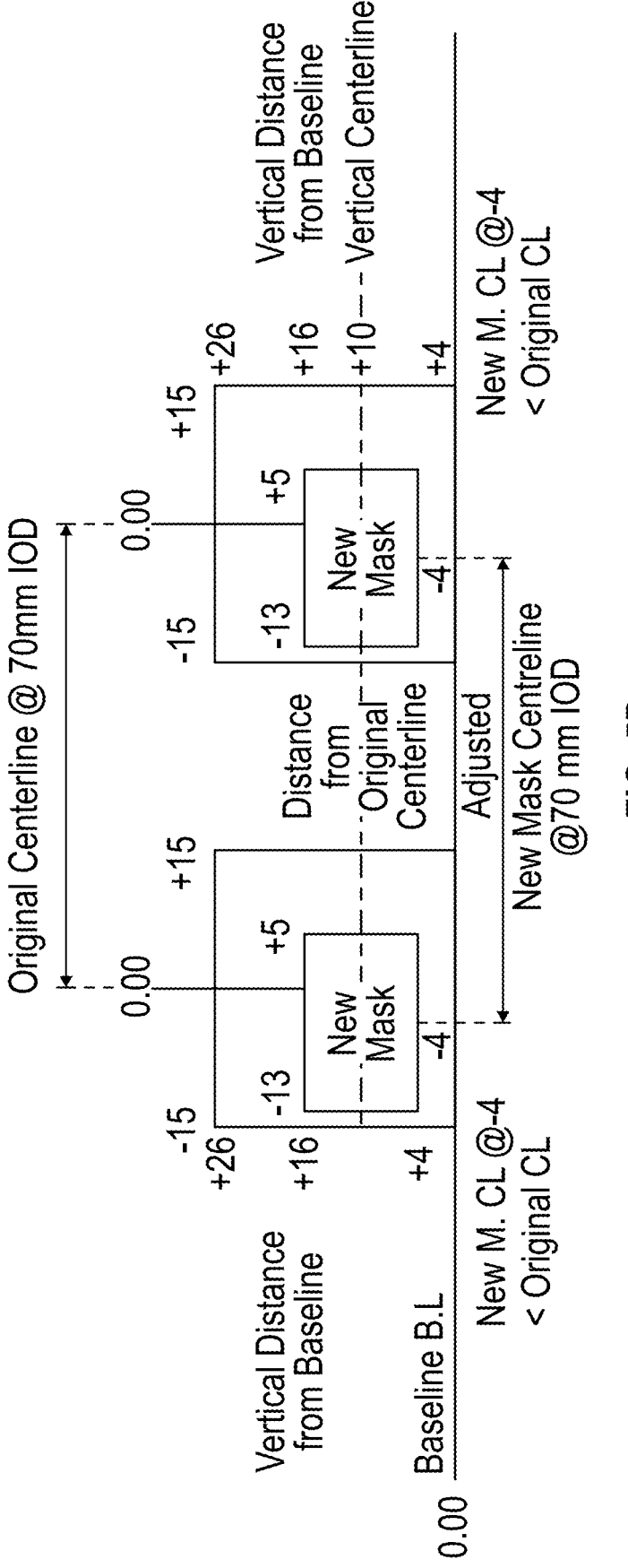
Figure 5E:
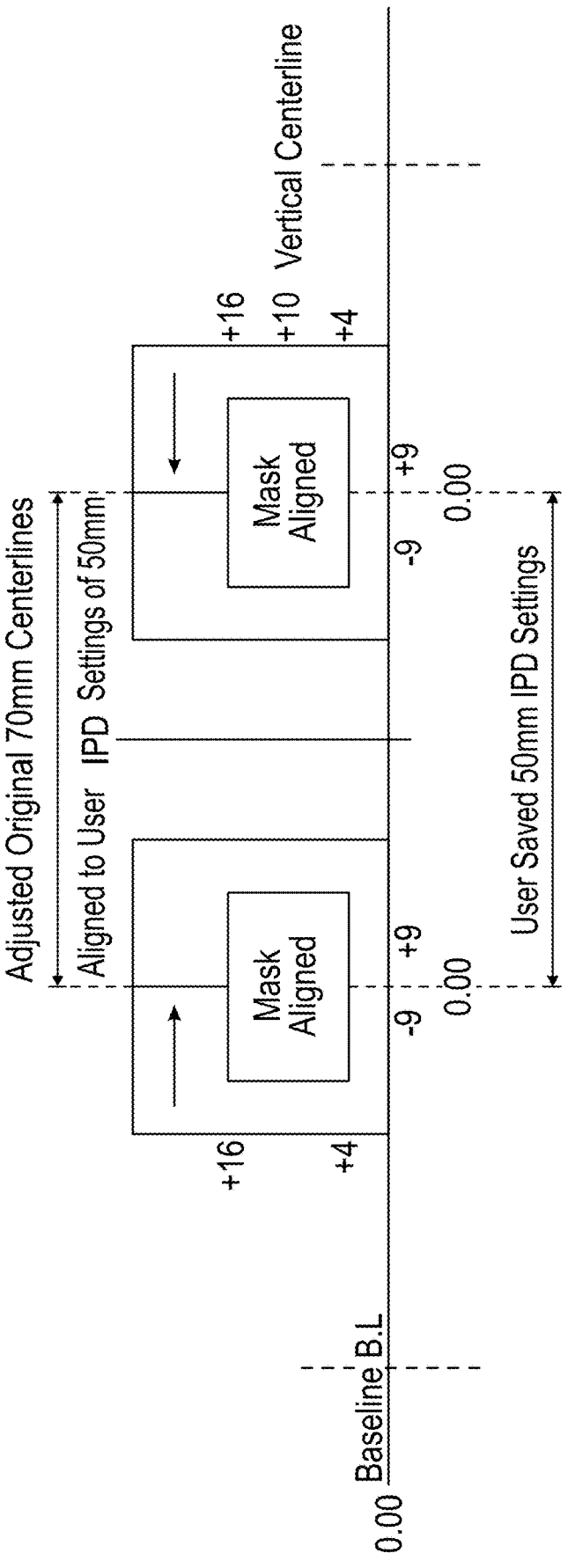

As shown in FIG. 5C, the 3D viewer 200 can allow the user to enlarge the masked images. For example, the user can provide commands as to whether the mask is visible and/or how much of the mask is shown for artistic focus. In the example illustrated in FIG. 5C, the masked image can be expanded to fill a larger area of the display. FIGS. 5D and 5E illustrate another example of adjusting the new mask centerline and aligning to the user's saved IPD settings.

Figures 6A, 6B:
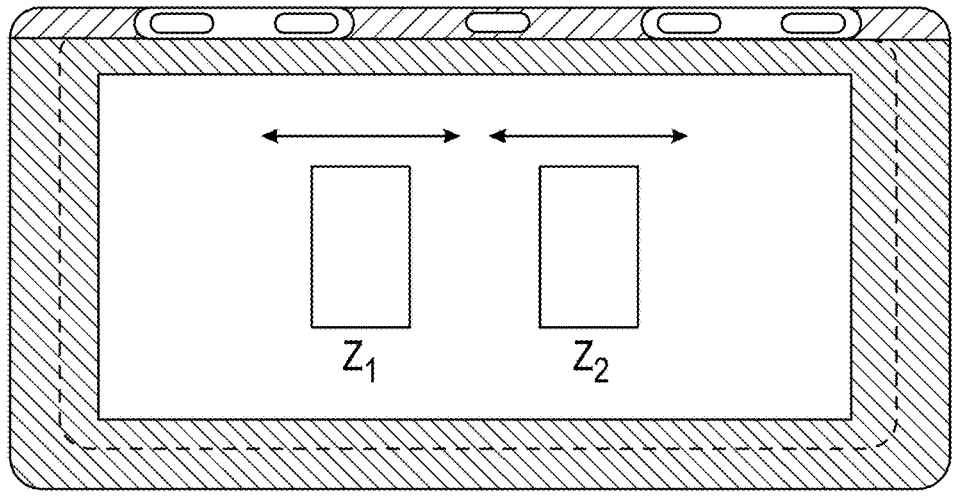
FIGS. 6A and 6B illustrate an example of the 3D viewer configured to obtain vertical images and use the images for display on the 3D viewer.

FIGS. 6A and 6B illustrate an example of the 3D viewer 200 configured to obtain vertical images and use the images for display on the 3D viewer 200. With reference to FIG. 6A, multiple angles of an image area can be captured vertically. In certain situations, this can provide improved 3D imagery. FIG. 6B illustrates how the image taken vertically can be displayed on the display of the 3D viewer 200. As described herein, the centerlines of the vertical images can be aligned with the user's IPD settings.

Figure 7A:
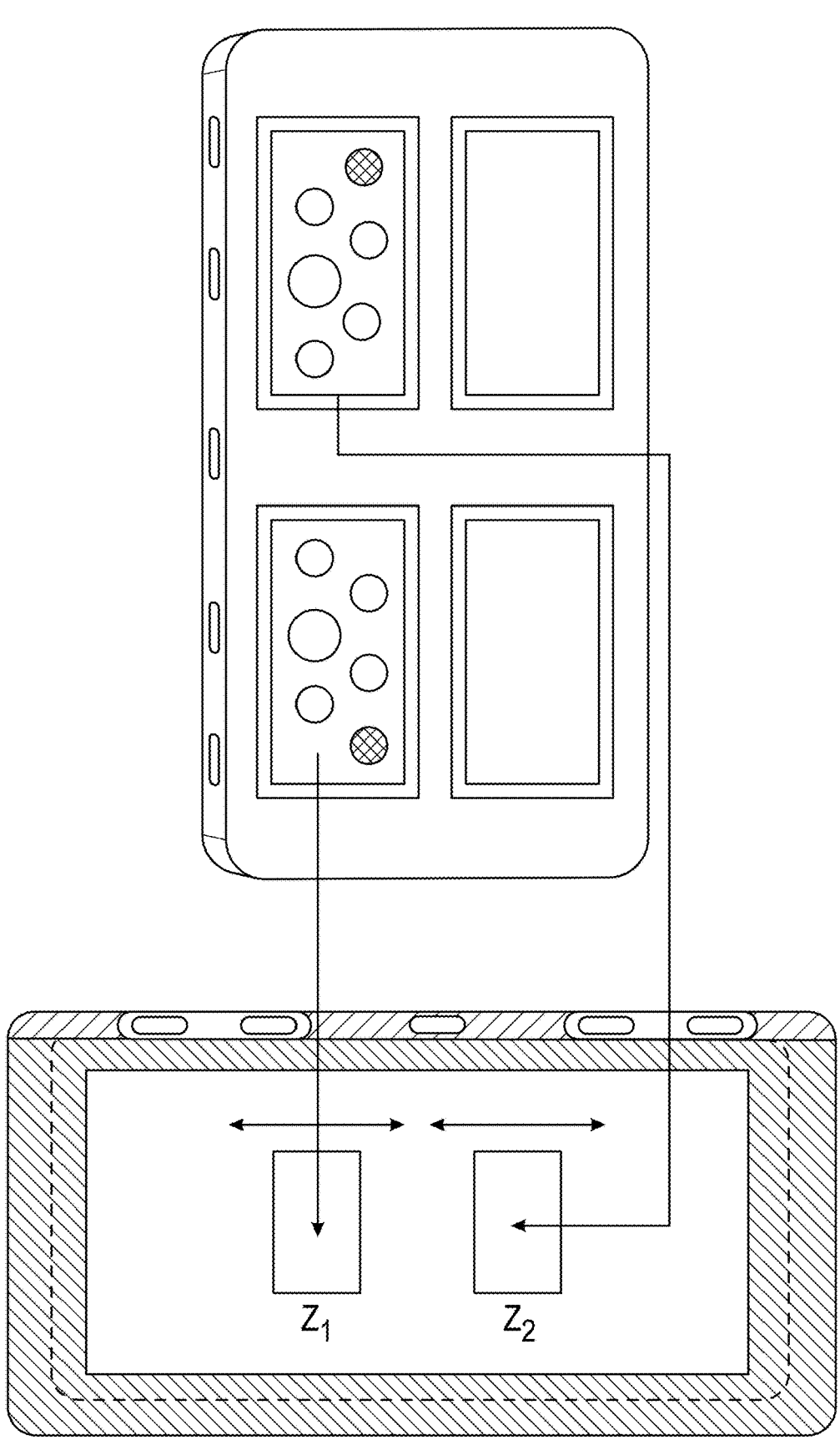
FIGS. 7A and 7B illustrate an example of how multiple images taken vertically can be positioned for display on the 3D viewer.
Figure 7B:
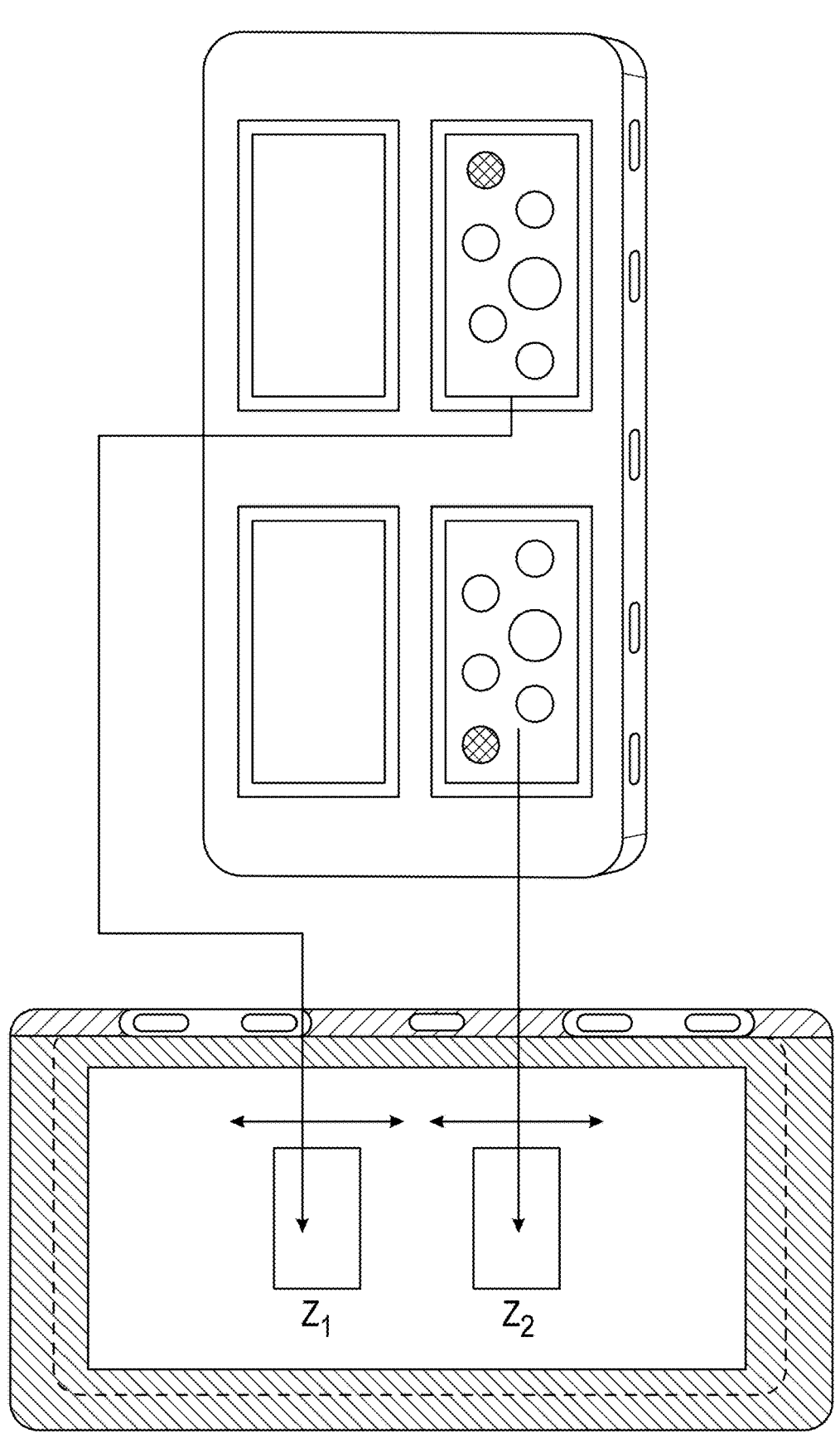

FIGS. 7A and 7B illustrate an example of how a pair of images (e.g., one image per lens) taken vertically can be positioned for display on the 3D viewer 200. In both examples, masking and camera vertical baselines can be applied to the captured images. Each image can include a wide angle view to improve the 3D effects when displayed on the 3D viewer 200.

FIG. 7A illustrates an example in which the top image is displayed to the right eye of the user and the bottom image is displayed to the left eye of the user. In the example of FIG. 7B, the top image is displayed to the left eye of the user and the bottom image is displayed to the right eye of the user. Advantageously, the system is configured to always display the correct 3D image to the correct eye, however, the camera may be rotated vertically or horizontally.

ADDITIONAL EMBODIMENTS

Figure 8A:
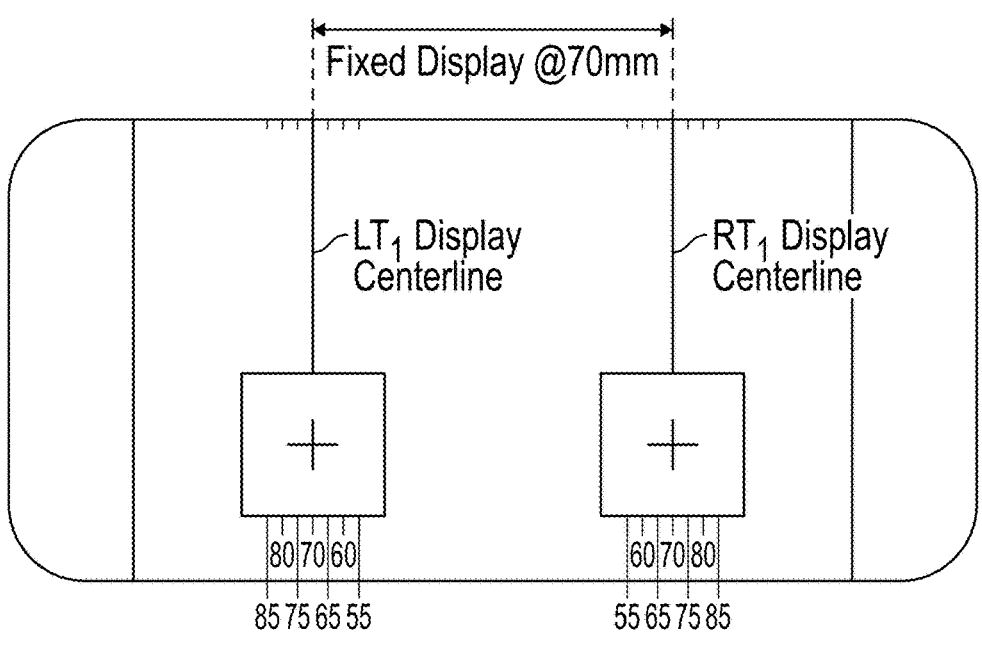
FIGS. 8A and 8B illustrate how a fixed display cannot be adjusted to match any persons inter-pupillary-distance that is not equal to the fixed image display.
Figure 8B:
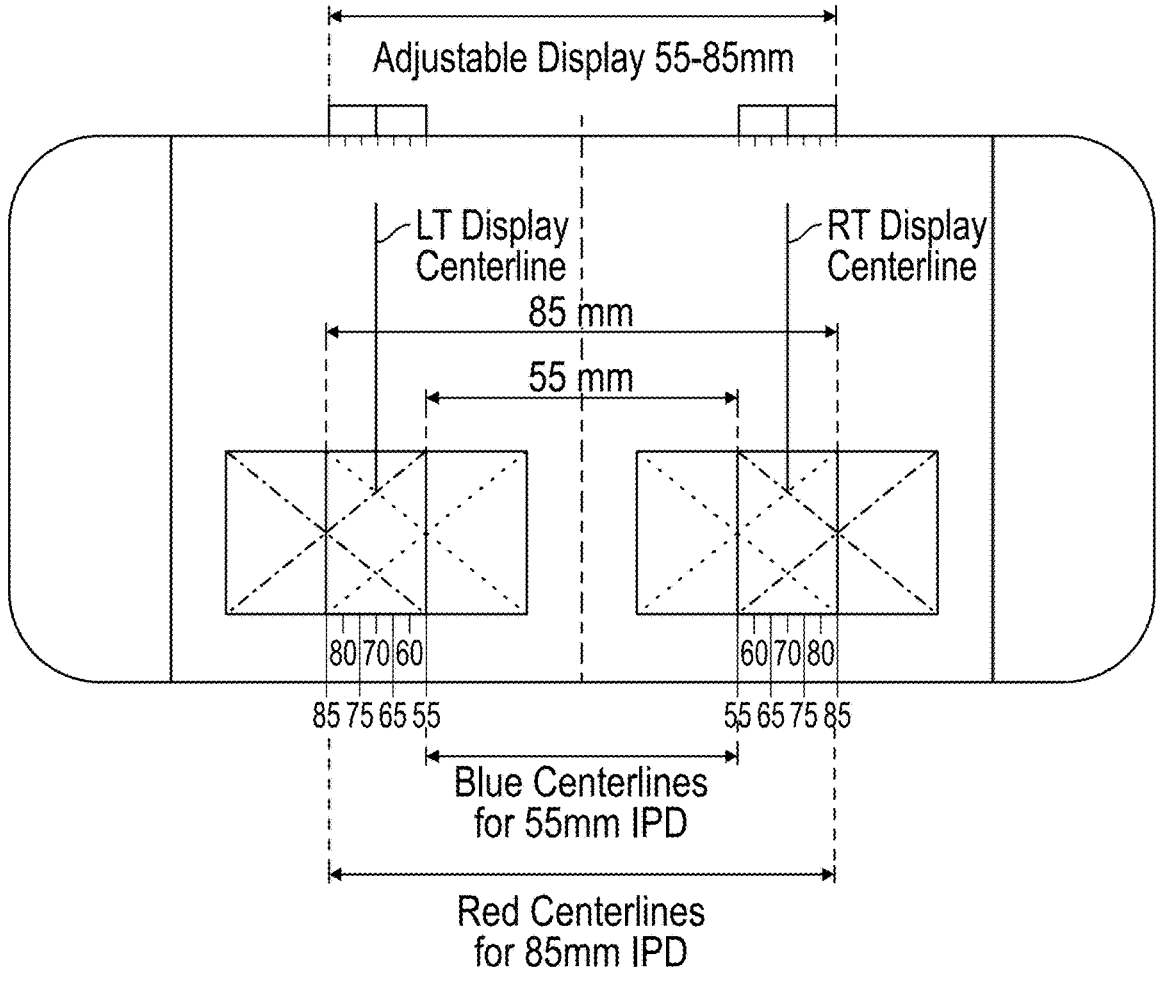

FIGS. 8A and 8B illustrate how a fixed display cannot be adjusted to match any persons inter-pupillary-distance that is not equal to the fixed image display. In particular, FIG. 8A illustrates how a fixed image display aligns with persons who have an equal inter-pupillary distance. FIG. 8B Illustrates how an adjustable range of centerline widths, accommodates a much wider range of users' inter-pupillary distances, that fixed image centerlines may not be able to.

Figure 9A:
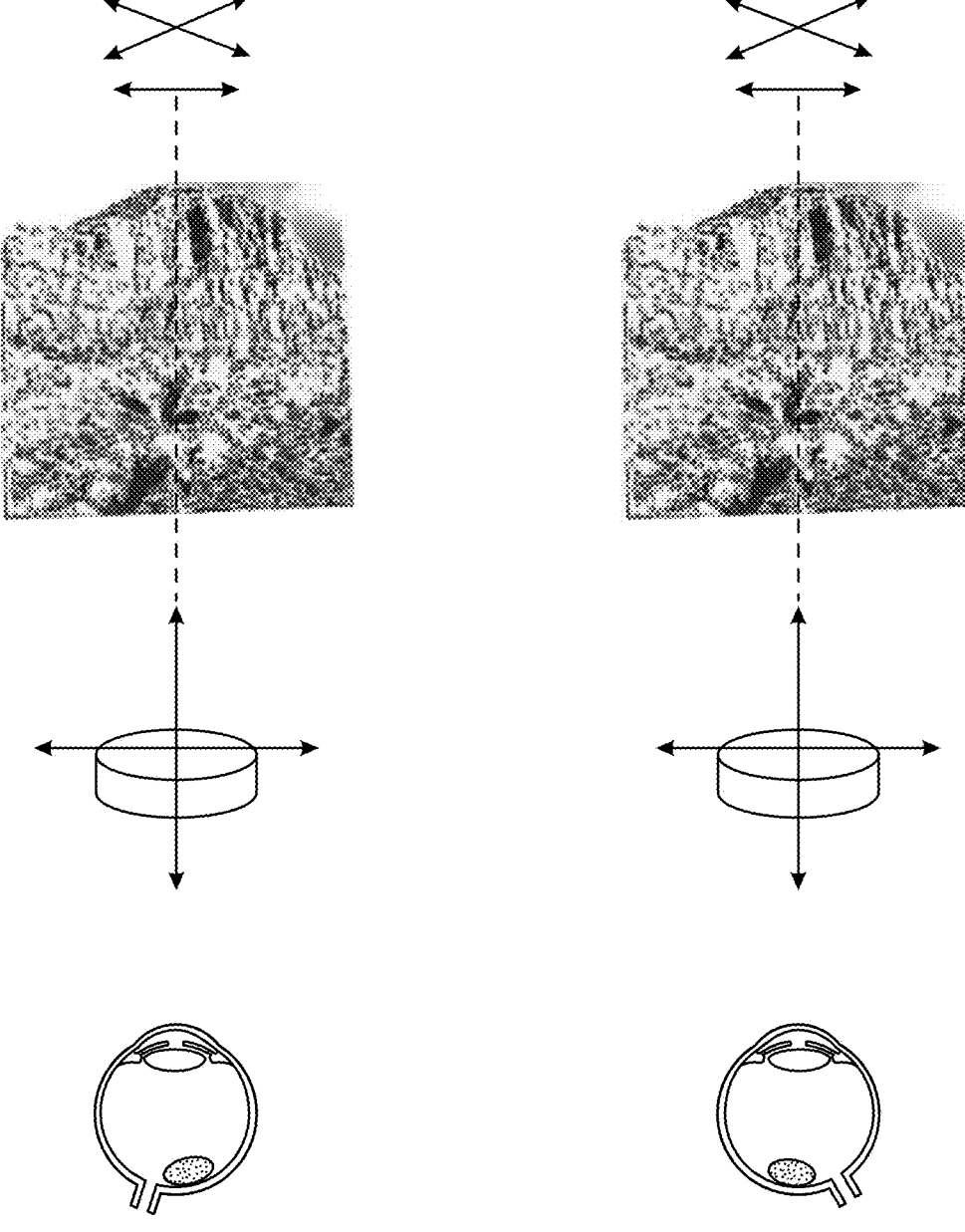
FIG. 9A illustrates how the focus lens and the image centerlines are aligned with the user's eyes.
Figure 9B:
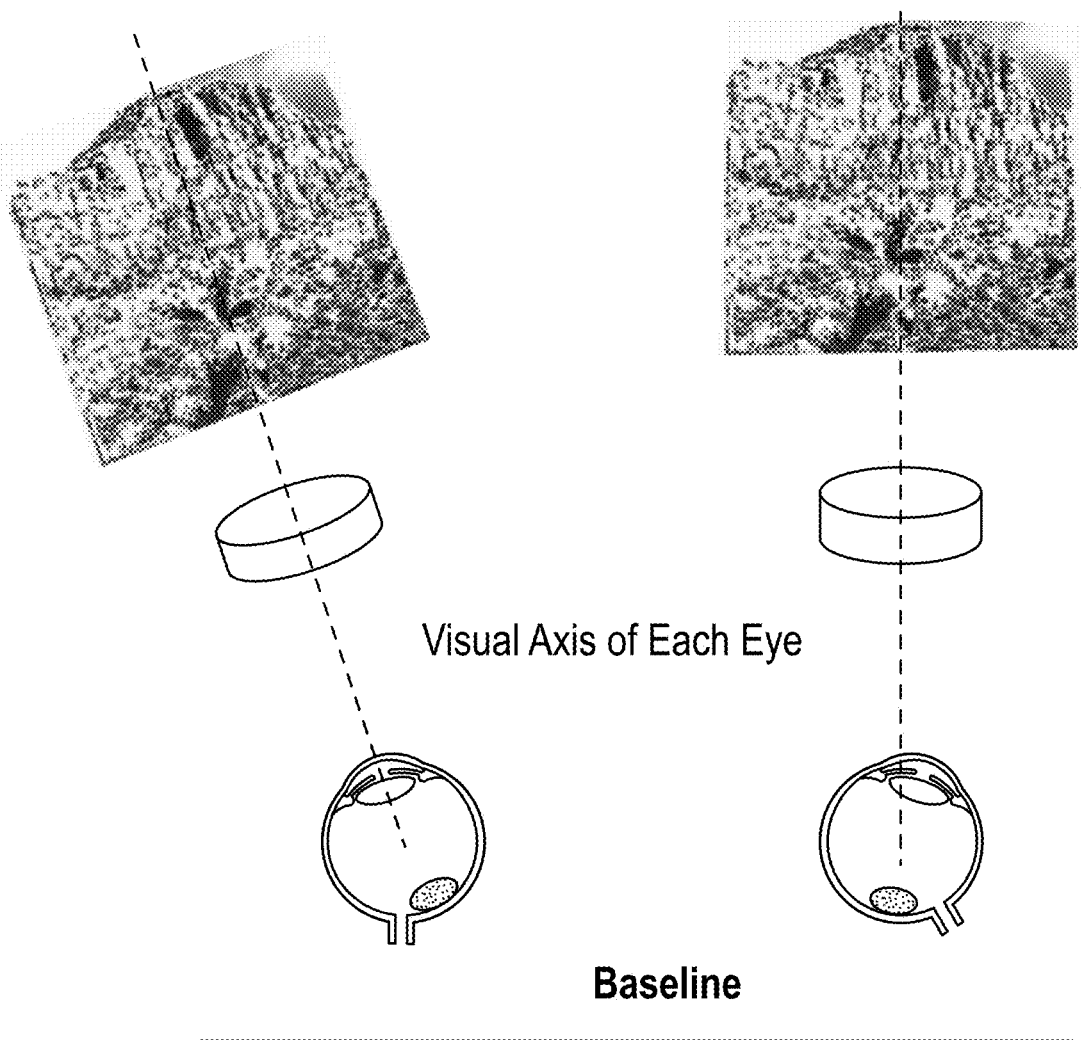
FIG. 9B illustrates how someone with a pupil alignment that is skewed still has a correct pupil alignment with the lens and image centerline.

FIG. 9A illustrates how the focus lens and the image centerlines are aligned with the user's eyes. FIG. 9B illustrates how someone with a pupil alignment that is skewed still has a correct pupil alignment with lens and image centerline.

Figure 10A:
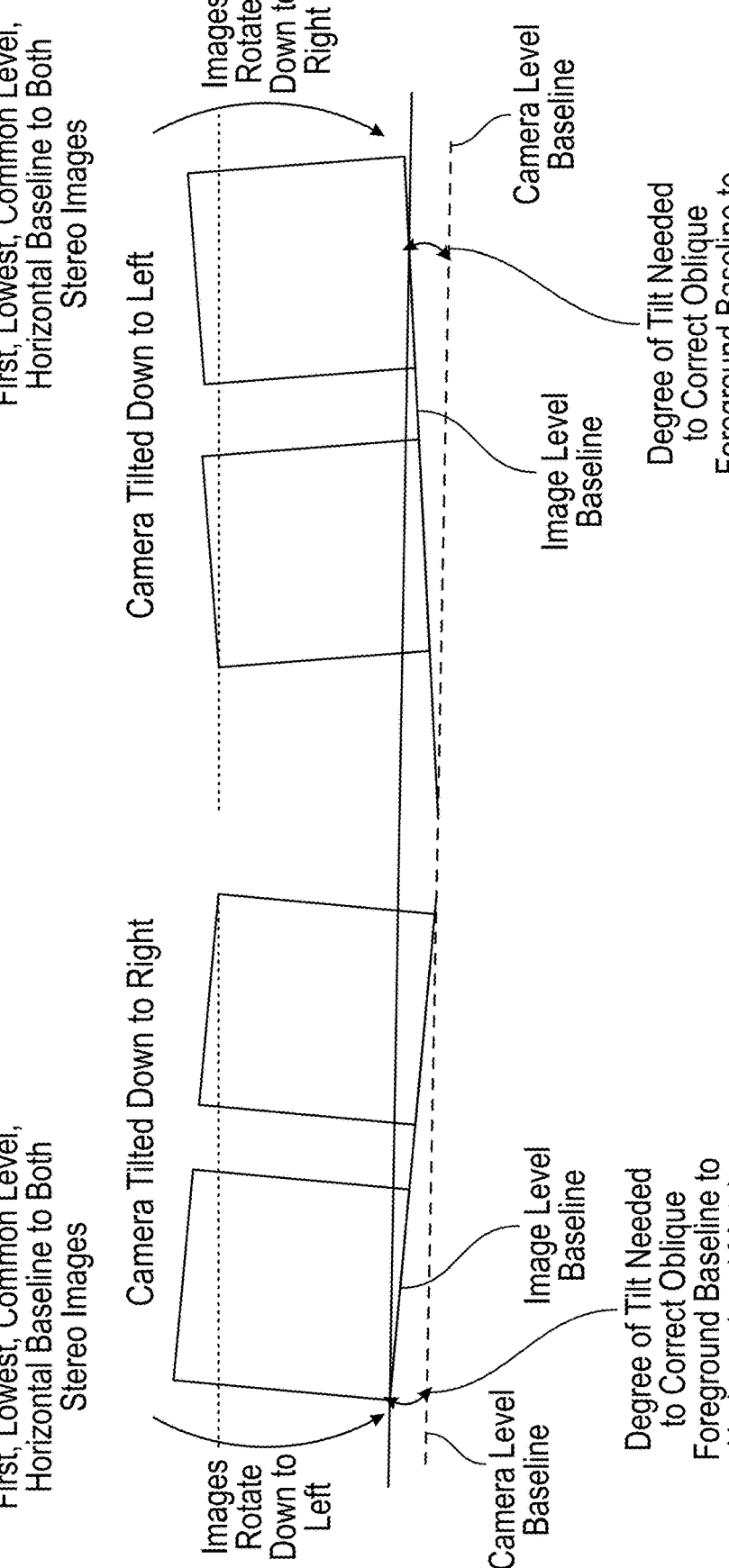
FIG. 10A illustrates how the 3D viewer can determine the first, lowest, common level horizontal baseline to both oblique images.

FIG. 10A illustrates how the 3D viewer can determine the first, lowest, common level horizontal baseline to both oblique images.

Figure 10B:
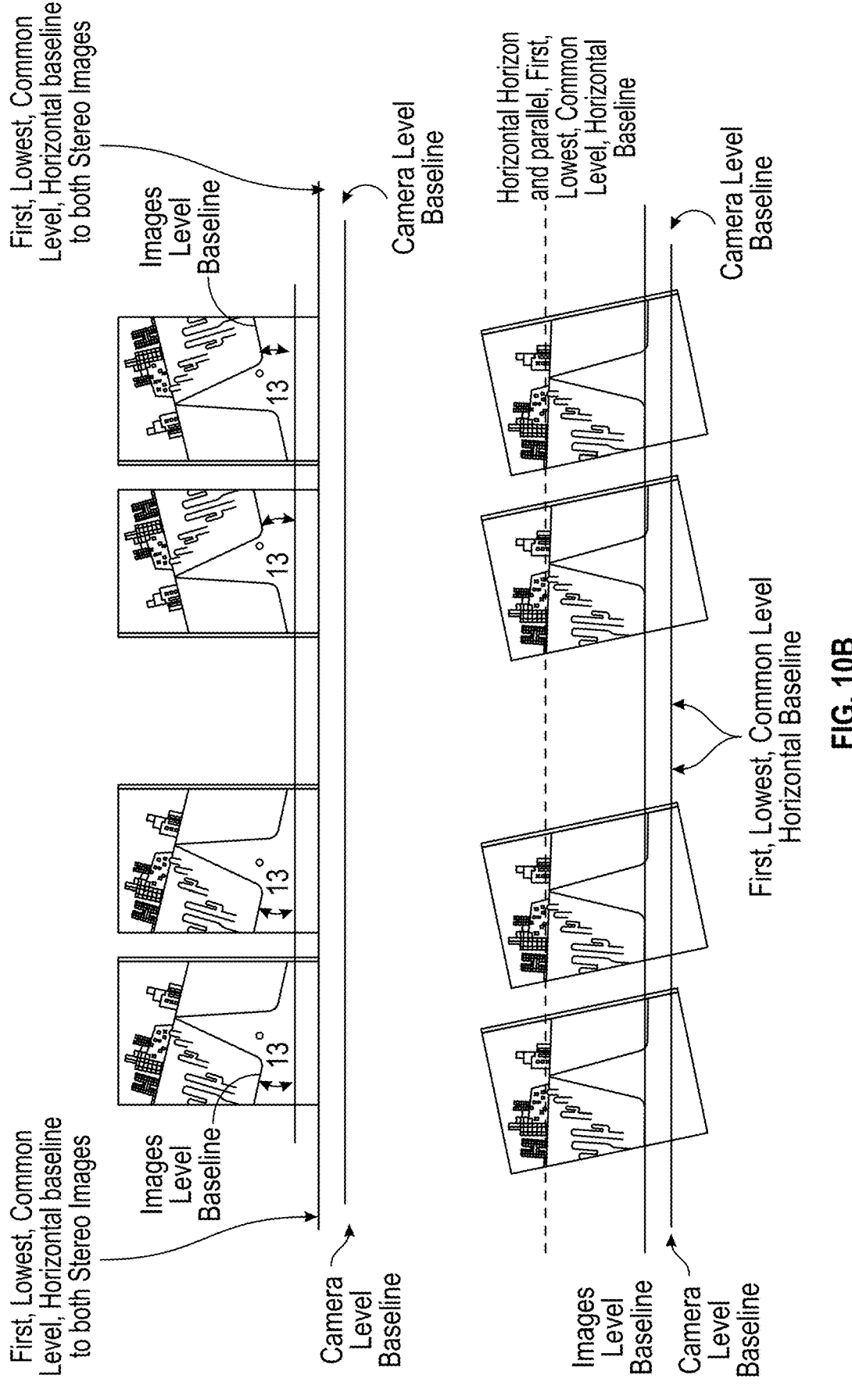
FIG. 10B illustrates how the first, lowest, common level horizontal baseline may be parallel to the corrected (horizontal) image level baseline.

FIG. 10B illustrates how the first, lowest, common level horizontal baseline may be parallel to the corrected (horizontal) image level baseline. In some embodiments, the image level baseline can be corrected to be parallel to the camera level baseline, but the image level baseline does not need to match the camera level baseline as the image foreground.

Figure 11:
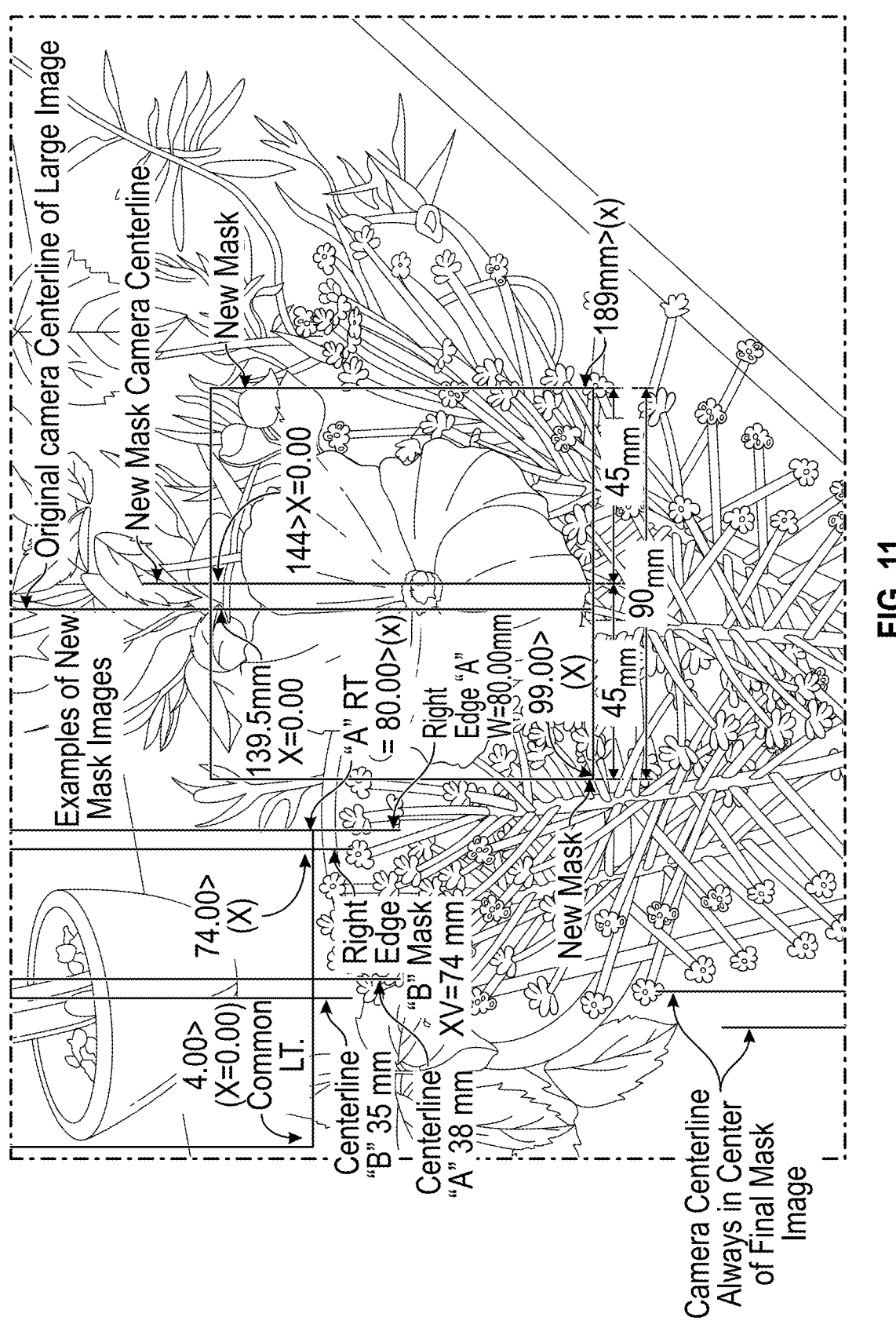
FIG. 11 illustrates how a user can create newly masked image(s) with new image centerline(s) and how the new image centerline(s) are used to align the new image(s) centerline(s) to the user's eye centerline.

FIG. 11 illustrates how a user can create a newly masked image with a new image centerline and how the new image centerline(s) are used to align the new image(s) centerline to the user's eye centerline. In the embodiment of FIG. 11, the X-axis (horizontal baseline) and the Y-axis (vertical baseline) edges are finely calibrated for the camera centerline to match the center of the newly masked images. Accordingly, the new mask camera centerline is located in the middle of the newly masked images. The mask between images may be automatic. In some embodiments, the stereo 3D images have slightly different camera centerline of lens, so transferring the mask between images can be performed automatically.

FIGS. 12A-12E illustrate how the 3D viewer can identify the oblique images based on the degree of variance from camera level baseline, and the degree of rotation needed to correct the degree of variance.

Figure 13:
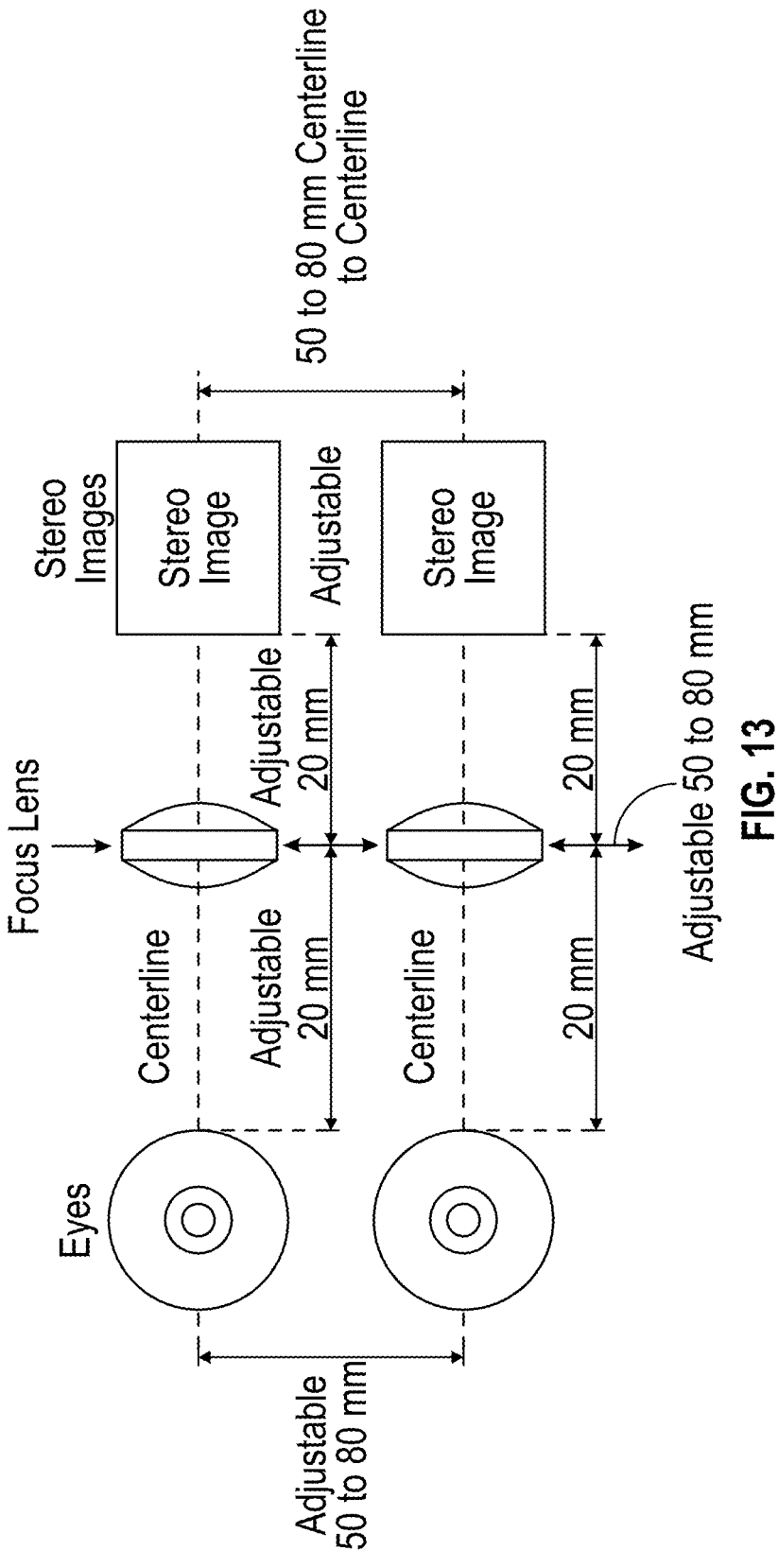
FIG. 13 illustrates an example of eye-lens-image adjustment and alignment ranges.

FIG. 13 illustrates an example of eye-lens-image adjustment and alignment ranges. Those skilled in the art will realize that the ranges may vary for different users.

CONCLUSION

It will be understood that implementations of the 3D image viewer can include but are not limited to the specific components disclosed herein, as virtually any components whose programs are consistent with the 3D viewing protocols described herein in which the various 3D image viewers may be utilized. Accordingly, for example, it should be understood that, while the drawings and accompanying text show and describe particular 3D image viewer implementations, any such implementation may comprise any shape, size, style, type, model, version, class, grade, measurement, concentration, material, weight, quantity, and/or the like consistent with the intended operation of 3D image viewers.

The concepts disclosed herein are not limited to the specific 3D image viewers shown herein. For example, it is specifically contemplated that the components included in particular 3D image viewers may be formed of any of many different types of materials or combinations that can readily be formed into shaped objects and that are consistent with the intended operation of the 3D image viewer. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, 3D image viewers may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular 3D image viewer implementations, it should be readily apparent that a number of modifications may be made without departing from the spirit thereof and that these implementations may be applied to other implementations disclosed or undisclosed. The presently disclosed 3D image viewers are, therefore, to be considered in all respects as illustrative and not restrictive.

Any of the embodiments described above can be implemented in association with mobile devices such as cellular handsets. The principles and advantages of the embodiments can be used for any systems or apparatus, such as any uplink wireless communication device, that could benefit from any of the embodiments described herein. The teachings herein are applicable to a variety of systems. Although this disclosure includes example embodiments, the teachings described herein can be applied to a variety of structures.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a robot such as an industrial robot, an Internet of things device, a stereo system, a digital music player, a radio, a camera such as a digital camera, a portable memory chip, a home appliance such as a washer or a dryer, a peripheral device, a wrist watch, a clock, eye glasses, etc. Further, the electronic devices can include unfinished products.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

EXAMPLE ASPECTS

1. A method for reducing parallax eye strain when viewing a 3D image, the method comprising:

providing a 3D viewer configured to allow a user to view the 3D image, the 3D image comprising a left image configured to be displayed to a left eye of the user and a right image configured to be displayed to a right eye of the user, the 3D viewer having a left lens configured to display the left image and a right lens configured to display the right image;

adjusting a position of the left lens to align a center of the left lens with a center of the user's left eye;

adjusting a position of the right lens to align a center of the right lens with a center of the user's right eye;

aligning a center of the left image with the center of the left lens; and aligning a center of the right image with the center of the right lens.

2. A method for auto masking 3D images to precisely crop all images and save the new image centerlines to the users specific IOD settings thereby providing a personal field of 3D view specific to each individual user's IPD settings.

3. The method of Aspect 1, further comprising electronic connections from viewer to camera/phone to control phone/camera via the viewer, and/or Bluetooth connection from remote accessory to phone/camera.

What is claimed is:

1. A method for reducing parallax eye strain when viewing a three-dimensional (3D) image using a stereo image viewer, the method comprising:

displaying a 3D image on a stereo image viewer, the stereo image viewer comprising a display, a left lens, and a right lens, the display having a first portion configured to display a left image of the 3D image to a left eye of a user via the left lens and a second portion configured to display a right image of the 3D image to a right eye of the user via the right lens;

illuminating a first vertical line on the left lens at a center of the left lens;

adjusting a position of the left lens to align the first vertical line illuminated on the left lens with a center of the user's left eye;

illuminating a second vertical line on the right lens at a center of the right lens; and adjusting a position of the right lens to align the second vertical line illuminated on the right lens with a center of the user's right eye.

2. The method of claim 1, further comprising:

illuminating a third vertical line at a first registration mark on the left image;

adjusting a position of the left image within the first portion of the display to align the third vertical line with the center of the user's left eye;

illuminating a fourth vertical line at a second registration mark on the right image; and adjusting a position of the right image within the second portion of the display to align the fourth vertical line with the center of the user's right eye.

3. The method of claim 1, wherein:

the left image further includes a third registration mark indicating a center of the left image along the vertical axis, the right image further includes a fourth registration mark indicating a center of the right image along the vertical axis, and the method further comprises correcting tilt of the 3D image based on the third registration mark and the fourth registration mark.

4. The method of claim 3, wherein correcting the tilt of the 3D image comprises masking or moving the 3D image to achieve a level baseline for the left image and the right image.

5. The method of claim 1, further comprising:

masking a portion of the left image and the right image;

applying a third registration mark at a center of the masked left image along the vertical axis;

adjusting a position of the left image within the first portion of the display to align the third registration mark with the center of the user's left eye;

applying a fourth registration mark at a center of the masked right image along the vertical axis; and adjusting a position of the right image within the second portion of the display to align the fourth registration mark with the center of the user's right eye.

6. The method of claim 1, further comprising:

determining that a horizon of the 3D image is tilted with respect to the horizontal axis by more than a threshold amount; and correcting the horizon of the 3D image by rotating, elevating, and/or cropping the left image and the right image to provide a common level baseline for the left image and the right image.

7. The method of claim 1, further comprising:

obtaining a camera level baseline indicative of a level baseline of a camera that captured the 3D image;

determining a level line from a lowest corner of the lowest one of the left image and the right image based on the camera level baseline; and correcting a horizon of the 3D image based on the level line.

8. The method of claim 1, further comprising:

identifying a first and closest common level horizontal baseline for the left image and the right image;

masking the left image and the right image based on the identified common level horizontal baseline; and correcting the horizon of the 3D image based on the masked left image and the masked right image.

9. The method of claim 1, further comprising:

determining an image level baseline representing an oblique baseline of the left image and the right image;

obtaining a camera level baseline indicative of a level baseline of a camera that captured the 3D image; and rotating the left image and the right image based on the image level baseline to match a camera level baseline.

10. A stereo camera system, comprising:

a left lens;

a right lens;

a display having a first portion configured to display a left image of a three-dimensional (3D) image to a left eye of a user via the left lens and a second portion configured to display a right image of the 3D image to a right eye of the user via the right lens;

an input configured to receive commands from a user;

a processor; and a non-transitory computer readable medium storing instructions that when executed on the processor cause the processor to:

illuminate a first vertical line on the left lens at a center of the left lens;

adjust a position of the left lens to align the first vertical line illuminated on the left lens with a center of the user's left eye;

illuminate a second vertical line on the right lens at a center of the right lens; and adjust a position of the right lens to align the second vertical line illuminated on the right lens with a center of the user's right eye.

11. The stereo camera system of claim 10, wherein the instructions further cause the processor to:

independently move the left image and the right image horizontally within the display to align a first centerline of the left image with the user's left eye and a second centerline of the right image with the user's right eye.

12. The stereo camera system of claim 10, further comprising:

an interface configured to communicate with a mobile device, the interface configured to receive commands from the mobile device to control the stereo camera system.

13. The stereo camera system of claim 10, further comprising:

an interface configured to communicate with a remote control, the interface configured to receive commands from the remote control to control the stereo camera system.

14. The stereo camera system of claim 10, further comprising:

one or more support straps configured to mount the stereo camera system to the user's head.

15. The stereo camera system of claim 10, wherein the stereo camera system is configured to be held to the user's head without the use of support straps.

16. The stereo camera system of claim 10, wherein:

the 3D image was obtained using a different stereo camera system using a first 3D viewing protocol, and the instructions further cause the processor to display the 3D image in accordance with the 3D viewing protocol, the 3D viewing protocol configured to enable display of the 3D images on any compatible system while reducing parallax eye strain.

17. The stereo camera system of claim 16, wherein the 3D viewing protocol defines:

original image centerline registration, creation of a new mask or stereo masked image pair with a new centerline registration, and/or image alignment, movement, recording, data transfer and associated program features.

18. The stereo camera system of claim 10, further comprising:

an auto pupil sensor, configured to detect a position of the user's pupils, wherein the instructions further cause the processor to automatically align the centers of the left and right lenses with centerlines of the left and right images on the display to match the detected positions of user's pupils.

19. The stereo camera system of claim 10, further comprising:

a microphone configured to receive voice commands from the user, wherein the instructions further cause the processor to control the stereo camera system based on the voice commands.

20. The stereo camera system of claim 19, wherein the instructions further cause the processor to parse the voice commands provided by the user using artificial intelligence.

* * * * *